(12) United States Patent
Miyazaki et al.

(10) Patent No.: US 8,290,674 B2
(45) Date of Patent: Oct. 16, 2012

(54) BRAKE CONTROL SYSTEM AND BRAKE CONTROL METHOD

(75) Inventors: Tetsuya Miyazaki, Toyota (JP); Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 417 days.

(21) Appl. No.: 12/667,391

(22) PCT Filed: Aug. 6, 2008

(86) PCT No.: PCT/IB2008/002068
§ 371 (c)(1),
(2), (4) Date: Dec. 31, 2009

(87) PCT Pub. No.: WO2009/019577
PCT Pub. Date: Feb. 12, 2009

(65) Prior Publication Data
US 2010/0198476 A1 Aug. 5, 2010

(30) Foreign Application Priority Data
Aug. 7, 2007 (JP) ................................ 2007-205884

(51) Int. Cl.
*G06F 7/00* (2006.01)
(52) U.S. Cl. ....................................................... 701/69
(58) Field of Classification Search .................... 701/69, 701/70, 78; 303/3, 15, 9.62, 152
See application file for complete search history.

(56) References Cited

U.S. PATENT DOCUMENTS

| | | | |
|---|---|---|---|
| 5,399,000 A | 3/1995 | Aoki et al. | |
| 5,472,264 A | 12/1995 | Klein et al. | |
| 2004/0070270 A1 | 4/2004 | Gunji | |
| 2004/0239174 A1 | 12/2004 | Kokubo | |
| 2006/0238024 A1* | 10/2006 | Akita | 303/155 |
| 2007/0018499 A1 | 1/2007 | Kokubo et al. | |
| 2007/0194622 A1* | 8/2007 | Nakazawa et al. | 303/155 |
| 2008/0207391 A1* | 8/2008 | Ikematsu et al. | 477/28 |
| 2009/0091180 A1* | 4/2009 | Iwasaki et al. | 303/11 |
| 2011/0241417 A1* | 10/2011 | Miyazaki et al. | 303/2 |

(Continued)

FOREIGN PATENT DOCUMENTS
CN 2827773 Y 10/2006

(Continued)

OTHER PUBLICATIONS

Office Action issued Feb. 17, 2012, in Chinese Patent Application No. 200880022896.6 with English translation.

*Primary Examiner* — Faye M. Fleming
(74) *Attorney, Agent, or Firm* — Oblon, Spivak, McClelland, Maier & Neustadt, L.L.P.

(57) ABSTRACT

A brake control system includes a first wheel cylinder that applies braking force to a first wheel according to hydraulic pressure; a second wheel cylinder that applies braking force to a second wheel according to hydraulic pressure; a brake actuator that receives current and individually controls the hydraulic pressure of the first wheel cylinder and the hydraulic pressure of the second wheel cylinder; a power supply that supplies the current to the brake actuator; and a control portion which sets a braking force distribution between the first wheel and the second wheel based on the state-of-charge of the power supply, and controls the brake actuator according to the braking force distribution.

17 Claims, 11 Drawing Sheets

U.S. PATENT DOCUMENTS

2011/0272230 A1* 11/2011 Sekiya et al. ............... 188/70 R
2012/0038209 A1* 2/2012 Yamamoto ................ 303/9.63

FOREIGN PATENT DOCUMENTS

| | | |
|---|---|---|
| DE | 41 24 496 | 1/1993 |
| JP | 9 249106 | 9/1997 |
| JP | 10 271607 | 10/1998 |
| JP | 11 124021 | 5/1999 |
| JP | 2001 171498 | 6/2001 |
| JP | 2001 247025 | 9/2001 |
| JP | 2003 137082 | 5/2003 |
| JP | 2004 216939 | 8/2004 |
| JP | 2005 145147 | 6/2005 |
| JP | 2007 69684 | 3/2007 |

* cited by examiner

BRAKE CONTROL SYSTEM AND BRAKE CONTROL METHOD

BACKGROUND OF THE INVENTION

1. Field of the Invention

The invention relates to a brake control system and a brake control method which controls braking force applied to a wheel of a vehicle.

2. Description of the Related Art

Japanese Patent Application Publication No. 2001-171498 (JP-A-2001-171498) describes a brake control system which sets a target pressure based on the operating amount of a brake pedal by the driver and controls an electromagnetic valve to realize this target pressure. Also, Japanese Patent Application Publication No. 10-271607 (JP-A-10-271607) describes a brake control system for an electric vehicle provided with mechanical braking means as well as regenerative braking means using an electric motor. This brake control system determines the distribution ratio between regenerative braking and mechanical braking according to the state-of-charge (SOC) of a battery.

Brake control systems in related arts are designed to control the braking force on the assumption that sufficient power will be supplied from a power supply. However, vehicles in recent years are equipped with many electrical components in addition to the brake control system, resulting in less and less reserve in the power supply. Thus, the voltage supplied from the power supply to the brake control system may be temporarily reduced. This may adversely affect brake control performance.

SUMMARY OF THE INVENTION

This invention thus provides a brake control system and a brake control method, which achieve sufficient brake performance even with low voltage.

A first aspect of the invention relates to a brake control system that includes a first wheel cylinder that applies braking force to a first wheel according to hydraulic pressure; a second wheel cylinder that applies braking force to a second wheel according to hydraulic pressure; a brake actuator that receives current and individually controls the hydraulic pressure of the first wheel cylinder and the hydraulic pressure of the second wheel cylinder; a power supply that supplies the current to the brake actuator; and a control portion which sets a braking force distribution between the first wheel and the second wheel based on a state-of-charge of the power supply, and controls the brake actuator according to the braking force distribution.

According to this aspect, the braking force distribution between the first and second wheels is set based on the state-of-charge of the power supply, and the hydraulic pressures of the first and second wheel cylinders are individually controlled by the brake actuator according to this braking force distribution. Setting the braking force distribution taking into account the state-of-charge of the power supply in this way makes it possible to optimally adjust the braking force distribution to realize greater braking force with a lower operating voltage, for example.

The brake actuator may include a normally open control valve that is connected to the first wheel cylinder, and that is closed when current to maintain the hydraulic pressure in the first wheel cylinder is supplied to the normally open control valve. The control portion may set an upper limit value of the hydraulic pressure of the first wheel cylinder to equal to or less than a maximum pressure that can be maintained in the first wheel cylinder by the normally open control valve according to the state-of-charge of the power supply.

According to this configuration, the upper limit value of the hydraulic pressure of the first wheel cylinder is set based on the state-of-charge of the power supply. This upper limit value is set to equal to or less than the maximum pressure that is able to be maintained in the first wheel cylinder by the normally open control valve that is connected to the first wheel cylinder. For example, when the state-of-charge is insufficient, the supply voltage drops so the hydraulic pressure that is able to be maintained in the first wheel cylinder by the normally open control valve decreases. Setting the upper limit value of the hydraulic pressure of the first wheel cylinder to a value equal to or less than the maximum pressure that is able to be maintained makes it possible to reduce the difference between a target hydraulic pressure that is set for the first wheel cylinder and the actual hydraulic pressure of the first wheel cylinder. More specifically, for example, it is possible to inhibit a difference between the actual hydraulic pressure and the target hydraulic pressure from occurring as a result of a target hydraulic pressure that is too large to be realized being set when the SOC of the power supply is low. Inhibiting a difference between the actual hydraulic pressure and the target hydraulic pressure in this way makes it possible to suppress a decrease in the braking force control performance even when the state-of-charge of the power supply is low, for example.

The brake actuator may also include a pressure reduction valve that is normally closed, and is connected to the second wheel cylinder. The control portion may control the brake actuator to generate a portion of a target hydraulic pressure which is set according to at least one of the brake operation by a driver and a vehicle state by controlling the hydraulic pressure of the first wheel cylinder to be equal to or less than the upper limit value. Also, the control portion may control the brake actuator to complementarily generate the rest of the target hydraulic pressure by controlling the hydraulic pressure of the second wheel cylinder.

According to this configuration, the pressure reduction valve, which is normally closed when de-energized, is connected to the second wheel cylinder, unlike the first wheel cylinder. Therefore, the second wheel cylinder can be maintained at a higher pressure than the first wheel cylinder when the state-of-charge of the power supply is low, for example. The hydraulic pressure of the first wheel cylinder is controlled to be equal to or less than the upper limit value that is set equal to or less than the maximum pressure that can be maintained, and the hydraulic pressure of the second wheel cylinder is complementarily controlled to achieve the target hydraulic pressure. In this way, even when the state-of-charge of the power supply is low, the target hydraulic pressure can be realized by using the first and second wheel cylinders in combination, thus suppressing braking force control performance from deteriorating.

The first wheel may be a rear wheel, and the second wheel may be a front wheel. The control portion may control the hydraulic pressure of the second wheel cylinder to be equal to or greater than the hydraulic pressure of the first wheel cylinder.

For example, when the state-of-charge of the power supply is sufficiently high, the upper limit value of the hydraulic pressure of the first wheel cylinder is set high. More braking force can be distributed to the front wheel than is distributed to the rear wheel, regardless of the upper limit value, by controlling the hydraulic pressure of the second wheel cylinder to be equal to or greater than the hydraulic pressure of the first wheel cylinder. Normally, it is preferable to have more braking force be distributed to the front wheel than the rear wheel. Accordingly, it is possible to both set an optimal braking force distribution that takes into account the state-of-charge of the power supply and realize the normally preferable braking force distribution.

The brake actuator may also include a pressure increase valve that is normally closed, and is connected to the second wheel cylinder. Also, the control portion may i) set a required hydraulic pressure to be generated in the second wheel cylinder based on the required brake performance and the upper limit value, ii) determine whether the required hydraulic pressure can be generated in the second wheel cylinder through the pressure increase valve, based on the state-of-charge of the power supply, and iii) increase the pressure upstream of the pressure increase valve so that at least the required hydraulic pressure can be generated if the determination is negative.

According to this configuration, the hydraulic pressure upstream of the pressure increase valve is increased to be able to generate the required hydraulic pressure in the second wheel, cylinder in order to achieve the required brake performance. Increasing the hydraulic pressure in this way ensures to generate the required hydraulic pressure in the second wheel cylinder. As a result, it is possible to ensure that the required brake performance such as a statutory brake performance is realized with the cooperation of the first wheel cylinder. Also, if the hydraulic pressure upstream of the pressure increase valve is further increased, the current to be supplied to the vcontrol valve can be further reduced.

The brake actuator may also include a hydraulic pressure source which is provided upstream of the pressure increase valve and accumulates hydraulic fluid in order to increase the pressure upstream of the pressure increase valve, and a pump which is driven by current supplied from the power supply in order to accumulate hydraulic fluid in the hydraulic pressure source. Also, the control portion may control the supply of current to the pump to accumulate hydraulic fluid in the hydraulic pressure source when current is not being supplied to the normally open control valve and the pressure increase valve.

According to this configuration, when the pump for accumulating hydraulic fluid in the hydraulic pressure source and the valves for controlling the wheel cylinder pressure use a common power supply, current is supplied to the pump when the valves are de-energized. Therefore, the valves and the pump do not consume current at the same time, which is advantageous because it may reduce the voltage to be applied to the brake actuator, i.e., the operating voltage.

The brake actuator may also include a normally closed pressure reduction valve that is connected to the second wheel cylinder, and a normally opened control valve that is connected in parallel with the pressure reduction valve with respect to the second wheel cylinder. This pressure reduction valve is opened when a valve opening current is supplied, which is determined according to a differential pressure between the wheel cylinder pressure and atmospheric pressure. The control portion may reduce the hydraulic pressure of the second wheel cylinder using a combination of the pressure reduction valve and the normally open control valve.

According to this configuration, the hydraulic pressure of the second wheel cylinder can be more reliably reduced using the normally open control valve together. Thus, although the wheel cylinder pressure is unable to be sufficiently reduced using only the pressure reduction valve due to, for example, a small supply current, it enables the hydraulic pressure of the second wheel cylinder to be reliably reduced.

The normally open control valve may be a master cutoff valve provided between the second wheel cylinder and a manual hydraulic pressure source that pressurizes hydraulic fluid according to a brake operation by a driver.

The master cutoff valve may be an electromagnetic valve that is opened when a solenoid is de-energized while being closed by electromagnetic force which is generated when a specified control current is supplied to the solenoid.

When a brake operation is not being performed, the manual hydraulic pressure source is normally at atmospheric pressure. Thus, it enables the hydraulic pressure of the second wheel cylinder to be reliably reduced to atmospheric pressure by opening the master cutoff valve. Also, there is no need to provide another control valve rather than the master cutoff valve that is typically provided in the brake actuator, which leads to a cost saving.

The control portion may selectively open and close the master cutoff valve by duty control when using the master cutoff valve to reduce the hydraulic pressure of the second wheel cylinder.

When duty control is performed on the master cutoff valve in this way, the master cutoff valve is typically repeatedly opened and closed in short cycles. Accordingly, the outflow of hydraulic fluid from the second wheel cylinder to the manual hydraulic pressure source through the master cutoff valve can be made gradual compared with when the master cutoff valve is opened all at once. This is advantageous in that it makes it possible to avoid a sudden increase in hydraulic pressure of the manual hydraulic pressure source, and thus a sudden change in brake pedal reaction force against the driver. Also, the normal hydraulic pressure of the manual hydraulic pressure source is used to calculate the target deceleration, which is advantageous in that the mitigation of fluctuation in the hydraulic pressure of the manual hydraulic pressure source contributes to a more stable brake feeling for the driver.

The control portion may correct a measurement value of the hydraulic pressure of the manual hydraulic pressure source or a target deceleration calculated based on the measurement value of the hydraulic pressure, in such a way as to mitigate fluctuation of the hydraulic pressure caused by the duty control.

Accordingly, the measurement value of the hydraulic pressure after a correction has been performed to reduce the effect of fluctuation in the hydraulic pressure caused by the duty opening/closing control of the master cutoff valve, can used to calculate the target deceleration of the vehicle. Alternatively, the calculated target deceleration may be corrected. As a result, it is possible to suppress an effect from the decrease in hydraulic pressure using the master cutoff valve on the calculation results for the target deceleration, and thereby improve the stability of the brake feeling.

The control portion may control the hydraulic pressure of the second wheel cylinder during braking to be equal to or greater than the hydraulic pressure of the manual hydraulic pressure source when the hydraulic pressure of the second wheel cylinder is unable to be reduced using only the pressure reduction valve under the state-of-charge of the power supply.

Controlling the hydraulic pressure of the second wheel cylinder so that it is equal to or greater than the hydraulic pressure of the manual hydraulic pressure source in this way makes it possible to reliably decrease the hydraulic pressure in the second wheel cylinder using the master cutoff valve.

The power supply that supplies current to the brake actuator may be provided in plurality, and the control portion may detect which power supply, from among the plurality of power supplies, is supplying the current, and set the braking force distribution between the first wheel and the second wheel based on the state-of-charge of that power supply.

A second aspect of the invention relates to a brake control method for controlling a braking force distribution between wheels by individually controlling hydraulic pressure supplied to a plurality of wheel cylinders. This brake control method includes setting, according to a state-of-charge of a power supply, a hydraulic pressure upper limit value for a wheel cylinder in which hydraulic pressure is maintained by supplying current to an accompanying control valve when determining the braking force distribution.

The brake control method may further comprise: generating a portion of a target hydraulic pressure by controlling the hydraulic pressure of the wheel cylinder in which the hydraulic pressure is maintained by supplying current to the accompanying control valve, to the hydraulic pressure upper limit value, while generating the rest of the target hydraulic pressure by controlling the hydraulic pressure of another wheel cylinder.

Also, The brake control method may further comprise: setting a required hydraulic pressure to be generated in the other wheel cylinder in order to achieve a required brake performance, based on the required brake performance and the hydraulic pressure upper limit value; and increasing the hydraulic pressure of the hydraulic pressure source to generate the required hydraulic pressure in the other wheel cylinder regardless of the state-of-charge of the power supply.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
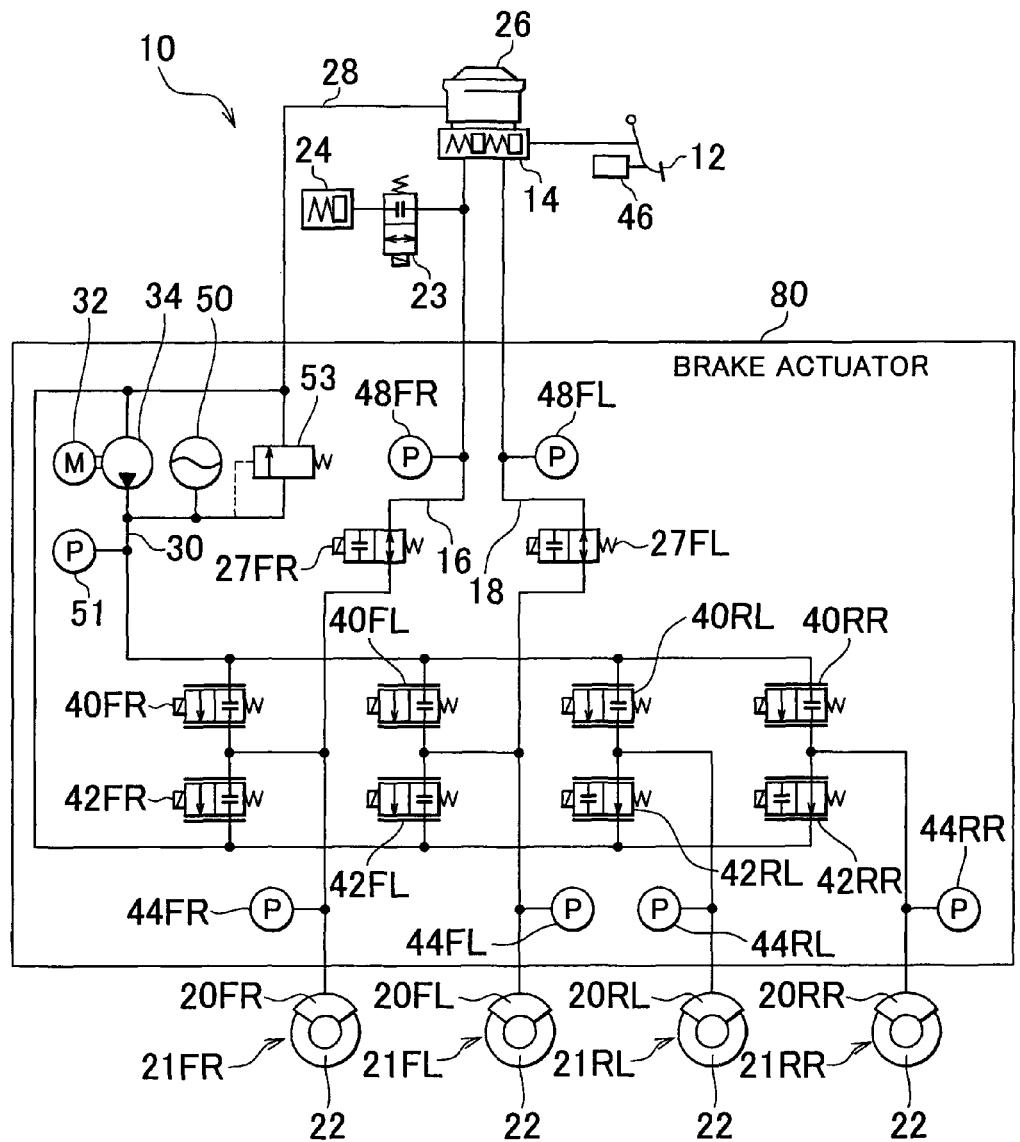
FIG. 1 is a system diagram of a brake control system according to a first example embodiment of the invention.

First, the concept of example embodiments of the invention will be described. In these example embodiments, a control portion executes braking force distribution control corresponding to the state-of-charge (SOC) of a power supply. This control optimally adjusts the braking force distribution among wheels based on the state-of-charge of a power supply in a brake control system. For example, the braking force distribution among the front and rear wheels is set so that a target braking force or the maximum braking force is generated according to the voltage able to be supplied from a battery to the brake control system. This kind of control may also hereinafter simply be referred to as "optimal distribution control".

In this optimal distribution control, the control portion sets an upper limit pressure in at least one wheel cylinder. Then during braking, the control portion controls the target pressure of this wheel cylinder so as not to exceed this upper limit pressure. More specifically, the control portion sets an upper limit pressure according to the battery voltage for a wheel cylinder that requires a supply of current in order to maintain the pressure. One example of when current is required in order to maintain the pressure is when a normally open electromagnetic control valve is connected to the wheel cylinder. The upper limit pressure is set, for example, to a value equal to the maximum pressure that can be maintained in a wheel cylinder, which corresponds to the amount of current applied to the control valve, according to the state of the battery. For example, if the target pressure is set independent of the state of the battery when the SOC of the battery is low, the target pressure may end up being set to a value that exceeds the maximum pressure that can be maintained in the wheel cylinder. In this case, the actual pressure will not be able to reach the target pressure so the required braking force will not be able to be obtained. In contrast, in this example embodiment, the target pressure is set within a feasible range according to the state of the battery, and the wheel cylinder pressure is controlled within this feasible control range. As a result, the actual pressure can be adjusted to the target pressure regardless of fluctuation in the battery SOC, such that stable control performance can be maintained.

Also, in the optimal distribution control, the control portion may also set the required pressure in the other wheel cylinder where the upper limit pressure has not been set. This refers that the required pressure to be complementarily generated is set for the other wheel cylinder in order to achieve the required brake performance. The required brake performance is the statutory brake performance, for example. In these example embodiments, the required brake performance can be achieved by optimal braking force distribution corresponding to the state of the power supply.

These example embodiments are suitable when the effect of a drop in power supply voltage on the amount of hydraulic pressure that can be maintained in each wheel cylinder differs for each wheel cylinder. These example embodiments are also suitable when the current-pressure characteristics of pressure reduction control valves, for example, connected to the wheel cylinders differ, such as when a normally open control valve is connected to at least one wheel cylinder and a normally closed control valve is connected to the other wheel cylinder, for example. When the effect of a drop in power supply voltage differs depending on the wheel cylinder, optimal braking force distribution for achieving the required brake performance can be realized by adjusting the braking force distribution according to the state of the power supply.

Hereinafter, the example embodiments of the invention will be described in detail with reference to the drawings. FIG. 1 is a system diagram of a brake control system 10 according to a first example embodiment of the invention. This brake control system 10 is an electronically controlled brake system for a vehicle, which independently and optimally sets the braking force with respect to each of four wheels of a vehicle in response to an operation of a brake pedal 12, which serves as a brake operating member, by a driver. Also, the vehicle equipped with the brake control system 10 according to this example embodiment is provided with a wheel steering system, not shown, and an internal combustion engine and motor, also not shown, which serve as driving power sources for running.

The brake control system 10 according to this example embodiment is provided in, for example, a hybrid vehicle having both an electric motor and an internal combustion engine as power sources for running. In this kind of hybrid vehicle, braking is performed according to two methods, i) regenerative braking in which the vehicle is braked by regenerating the operational energy of the vehicle into electric energy, and ii) hydraulic braking by the brake control system 10. The vehicle in this example embodiment can execute "regenerative cooperative brake control" in which the desired braking force is generated using a combination of regenerative braking and hydraulic braking.

Disc brake units 21FR, 21FL, 21RR, and 21RL which serve as braking force applying mechanisms apply braking force to the right front wheel, the left front wheel, the right rear wheel, and the left rear wheel, respectively, of the vehicle. The disc brake units 21FR to 21RL each include a brake disc 22 and a wheel cylinder 20FR to 20RL housed in a brake caliper. The wheel cylinders 20FR to 20RL are all connected to a brake actuator 80 via different brake fluid lines.

In the brake control system 10, the brake actuator 80 includes a right master cutoff valve 27FR and a left master cutoff valve 27FL, pressure increase valves 40FR to 40RL, pressure reduction valves 42FR to 42RL, an oil pump 34, and accumulator 50 and the like, which will be described later. When brake fluid is supplied from the brake actuator 80 to the wheel cylinders 20FR to 20RL, brake pads which serve as friction members are pressed against the brake discs 22 which rotate with the wheels, thus applying braking force to the wheels.

Incidentally, in this example embodiment the disc brake units 21FR to 21RL are used but the invention is not limited to this. For example, other braking force applying mechanisms that include the wheel cylinders 20FR to 20RL, such as drum brakes for example, may also be used. Alternatively, the pressing force of the friction members does not have to be controlled by hydrodynamic force. For example, a braking force applying mechanism that controls the pressing force of the friction member against the wheel using an electric drive mechanism such as an electric motor may also be used.

The brake pedal 12 is connected to a master cylinder 14 that discharges brake fluid, i.e., hydraulic fluid, according to a depression operation performed by the driver. Also, a stroke sensor 46 that detects the depression stroke is provided with the brake pedal 12. The stroke sensor 46 may be configured so that sensors of two systems are proved in parallel. One outlet port of the master cylinder 14 is connected to a stroke simulator 24 that generates reaction force corresponding to the operating force with which the brake pedal 12 is depressed by the driver. A simulator cutoff valve 23 is provided midway in the flow line connecting the master cylinder 14 with the stroke simulator 24. The simulator cutoff valve 23 is a normally closed electromagnetic valve which is closed when de-energized and opens when operation of the brake pedal 12 by the driver is detected. Alternatively, however, the stroke simulator 24 may also be directly connected to the master cylinder 14 instead of via the simulator cutoff valve 23.

A right front wheel brake pressure control line 16 is connected at one end to one output port of the master cylinder 14, and at the other end to a right front-wheel wheel cylinder 20FR that applies braking force to a right front wheel, not shown. Similarly, a left front wheel brake pressure control line 18 is connected at one end to the other output port of the master cylinder 14, and at the other end to a left front-wheel wheel cylinder 20FL that applies braking force to a left front wheel, not shown.

A right master cutoff valve 27FR is provided midway in the right front wheel brake pressure control line 16, and a left master cutoff valve 27FL is provided midway in the left front wheel brake pressure control line 18.

The master cutoff valves 27FR and 27FL are both normally open electromagnetically control valves, each of which has a spring and a solenoid that is controlled on and off. These master cutoff valves 27FR and 27FL are opened when the solenoids are de-energized, and are closed by electromagnetic force generated by the solenoids to which a specified control current is supplied. When the master cutoff valves 27FR and 27FL are open, brake fluid is allowed to flow freely between the master cylinder 14 and the front-wheel wheel cylinders 20FR and 20FL. When the specified control current flows through the solenoids so that the master cutoff valves 27FR and 27FL close, this flow of brake fluid is interrupted.

Further, a right master pressure sensor 48FR that detects the master cylinder pressure on the right front wheel side is provided midway in the right front wheel brake pressure control line 16. Similarly, a left master pressure sensor 48FL that detects the master cylinder pressure on the left front wheel side is provided midway in the left front wheel brake pressure control line 18. With the brake control system 10, when the driver depresses the brake pedal 12, the depression amount is detected by the stroke sensor 46. However, the force with which the brake pedal 12 is depressed (i.e., the depression force) can also be obtained from the master cylinder pressure detected by the right master pressure sensor 48FR and the left master pressure sensor 48FL. In this way, supposing that the stroke sensor 46 were to fail, it is preferable from the viewpoint of a failsafe to monitor the master cylinder pressure using both the right master pressure sensor 48FR and the left master pressure sensor 48FL.

Also, a reservoir 26 for storing brake fluid is connected to the master cylinder 14. One end of a hydraulic pressure supply and discharge line 28 is connected to the reservoir 26. The other end of this hydraulic pressure supply and discharge line 28 is connected to an inlet of an oil pump 34 which is driven by a motor 32. An outlet of the oil pump 34 is connected to a high pressure line 30. An accumulator 50 and a relief valve 53 are also connected to this high pressure line 30. In this first example embodiment, the oil pump 34 is a reciprocating pump which has at least two pistons, not shown, that are driven in a reciprocating fashion by the motor 32. Also, the accumulator 50 in this example embodiment is an accumulator that converts the pressure energy of the brake fluid into pressure energy of a filler gas such as nitrogen and stores it. Incidentally, the motor 32, the oil pump 34, and the accumulator 50 may also be formed as a separate power supply unit and provided outside the brake actuator 80.

The accumulator 50 stores brake fluid that has been pressurized to approximately 14 to 22 MPa, for example, by the oil pump 34. Further, a valve outlet of the relief valve 53 is connected to the hydraulic pressure supply and discharge line 28 such that if the pressure of the brake fluid in the accumulator 50 becomes abnormally high, e.g., approximately 25 MPa, the relief valve 53 will open to return the high-pressure brake fluid to the hydraulic pressure supply and discharge line

28. Moreover, an accumulator pressure sensor 51 that detects the outlet pressure of the accumulator 50, i.e., the pressure of the brake fluid in the accumulator 50, is provided in the high pressure line 30.

The high pressure line 30 is connected to a right front-wheel wheel cylinder 20FR via a pressure increase valve 40FR, a left front-wheel wheel cylinder 20FL via a pressure increase valve 40FL, a right rear-wheel wheel cylinder 20RR via a pressure increase valve 40RR, and a left rear-wheel wheel cylinder 20RL via a pressure increase valve 40RL. The pressure increase valves 40FR to 40RL are all normally closed electromagnetic flowrate control valves (linear valves) which have springs and linear solenoids, and are closed when the solenoids are de-energized. The pressure increase valves 40FR to 40RL are arranged such that the differential pressure between the accumulator pressure upstream and the wheel cylinder pressure downstream is applied as a force that works to open the valves. The opening amounts of the pressure increase valves 40FR to 40RL are adjusted in proportion to the current supplied to the respective solenoids. Upstream pressure, i.e., accumulator pressure, is supplied through these pressure increase valves 40FR to 40RL to increase the pressure in the wheel cylinders 20FR to 20RL.

Also, the right front-wheel wheel cylinder 20FR is connected to the hydraulic pressure supply and discharge line 28 via a pressure reduction valve 42FR, and the left front-wheel wheel cylinder 20FL is connected to the hydraulic pressure supply and discharge line 28 via a pressure reduction valve 42FL. The pressure reduction valves 42FR and 42FL are both normally closed electromagnetic flowrate control valves (linear valves) used to decrease the pressure in the wheel cylinders 20FR and 20FL as necessary. The pressure reduction valves 42FR and 42FL each have a linear solenoid and a spring and are open when the solenoids are de-energized. The opening amounts of these valves are adjusted in proportion to the current supplied to the respective solenoids. The pressure reduction valves 42FR and 42FL are arranged such that the differential pressure between the wheel cylinder pressure upstream and the reservoir pressure (i.e., atmospheric pressure) downstream is applied as a force that works to open the valves.

Meanwhile, the right rear-wheel wheel cylinder 20RR is connected to the hydraulic pressure supply and discharge line 28 via a pressure reduction valve 42RR, and the left rear-wheel wheel cylinder 20RL is connected to the hydraulic pressure supply and discharge line 28 via a pressure reduction valve 42RL. The pressure reduction valves 42RR and 42RL are both normally open electromagnetic flowrate control valves (linear valves), each of which has a linear solenoid and a spring. These pressure reduction valves 42RR and 42RL are open when the solenoids are de-energized. The opening amounts of these valves are adjusted in proportion to the current supplied to the respective solenoids. Also, the valves close when the amount of current exceeds a predetermined current value set according to the wheel cylinder pressure. The pressure reduction valves 42RR and 42RL are arranged such that the differential pressure between the wheel cylinder pressure upstream and the reservoir pressure (i.e., atmospheric pressure) downstream is applied as a force that works to open the valves.

Also, wheel cylinder pressure sensors 44FR, 44FL, 44RR and 44RL for detecting the wheel cylinder pressure, which indicates the brake fluid pressure acting on each of the wheel cylinders 20FR, 20FL, 20RR and 20RL, are provided in the vicinity of the corresponding wheel cylinders 20FR, 20FL, 20RR and 20RL.

Figure 2:
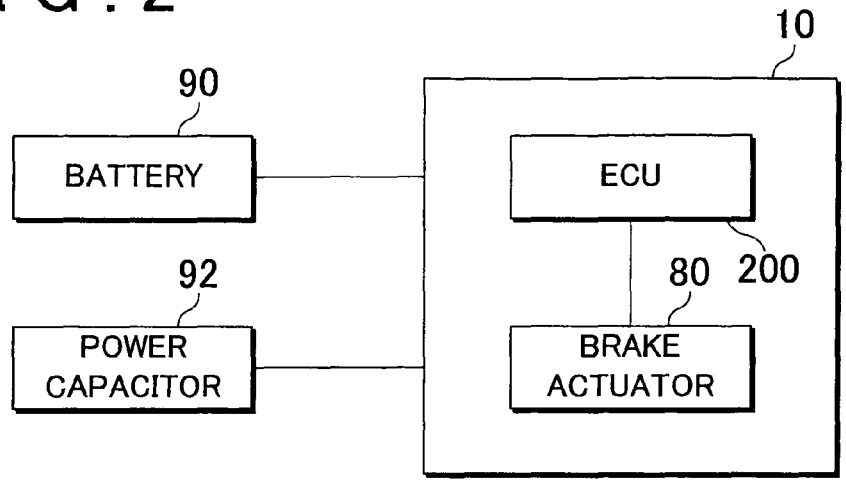
FIG. 2 is a schematic view of a system for supplying current to the brake control system according to the first example embodiment of the invention.

As shown in FIG. 2, the brake actuator 80 is controlled by an electronic control unit (hereinafter simply referred to as "ECU") 200 which serves as the control portion in this example embodiment. The ECU 200 includes a CPU that executes various operations, ROM in which various control programs are stored, RAM which is used to store data and as a work area for executing programs, an input/output interface, and memory and the like.

The brake control system 10 structured as described above is able to execute regenerative cooperative brake control. The brake control system 10 starts braking when a brake command is received. A brake command is generated when braking force is to be applied to the vehicle, such as when the driver depresses the brake pedal 12, for example. Upon receiving a brake command, the ECU 200 calculates a target deceleration, i.e., the required braking force, from the depression stroke of the brake pedal 12 and the master cylinder pressure. The ECU 200 then calculates a required hydraulic braking force, which is the braking force to be generated by the brake control system 10, by subtracting the regenerative braking force from the required braking force. Here, the regenerative braking force is supplied to the brake control system 10 by control according to a hybrid ECU, not shown. Then the ECU 200 calculates the target pressure of each wheel cylinder 20FR to 20RL based on the calculated required hydraulic braking force. The ECU 200 determines the value of the control current to supply to the pressure increase valves 40FR to 40RL or the pressure reduction valves 42FR to 42RL according to a feedback control law such that the wheel cylinder pressure comes to match the target pressure. The braking force distribution between the front and rear wheels is set according to the optimal distribution control according to this example embodiment, for example. The ECU 200 repeatedly executes the target deceleration and target pressure calculations and the control valve control at predetermined cycles during braking.

As a result, in the brake control system 10, brake fluid is supplied from the accumulator 50 to the wheel cylinders 20FR to 20RL via the pressure increase valves 40FR to 40RL such that the desired braking force is applied to the wheels. Also, brake fluid is discharged from the wheel cylinders 20FR to 20RL as necessary via the pressure reduction valves 42FR to 42RL to adjust the braking force applied to the wheels. In this way, so-called brake-by-wire braking force control is performed.

Meanwhile, the right master cutoff valve 27FR and the left master cutoff valve 27FL are normally closed at this time. During regenerative cooperative brake control, the differential pressure corresponding to amount of regenerative braking force acts between upstream and downstream of the master cutoff valves 27FR and 27FL. The brake fluid fed from the master cylinder 14 as a result of the driver depressing the brake pedal 12 flows into the stroke simulator 24 such that the appropriate pedal reaction force is generated.

FIG. 2 is a schematic view of a system for supplying current to the brake control system 10 according to the first example embodiment of the invention. As shown in FIG. 2, a battery 90 and a power capacitor 92 which serve as power supplies for the brake control system 10 are connected in parallel to the brake control system 10. As described above, the brake control system 10 includes the ECU 200 and the brake actuator 80 which are electrically connected to the battery 90 and the power capacitor 92 so that they receive power from the battery 90 or the power capacitor 92. In this example embodiment, the brake control system 10 selectively receives power from either the battery 90 or the power capacitor 92, whichever can output the higher voltage. Typically, power is supplied to the brake control system 10 from the power capacitor 92 and is only supplied from the battery 90 when the voltage able to be supplied from the power capacitor 92 is less than the voltage able to be supplied from the battery 90. The battery 90 and the power capacitor 92 are charged by an alternator, not shown, when the engine is operating.

For example, the power capacitor 92 is provided as a dedicated power supply of the brake control system 10, and the battery 90 is provided to supply power to the brake control system 10 as well as other electrical components. In this case, because the power capacitor 92 is a dedicated power supply, it is configured to supply voltage to realize the desired brake control to the brake control system 10 when sufficiently charged. However, in order to maintain the durability and the like of the power capacitor 92, the power capacitor 92 may be discharged after the ignition has been turned off, for example. If this is done, then the next time the ignition is turned on, the brake control system 10 will be powered by the battery 90 until the power capacitor 92 is charged. Also, depending on the type of vehicle, the vehicle may not even be equipped with the power capacitor 92 in the first place, in which case the brake control system 10 is powered by the battery 90.

In particular, when a vehicle is equipped with many electrical components, as is the case in recent years, the amount of reserve in the capacity of the battery 90 tends to decrease. Therefore, it is desirable to develop a brake control system that can generate the required braking force even at a low operating voltage. The operating voltage of the brake control system is determined based on, for example, the electromagnetic control valves within the brake actuator and the drive circuit of that electromagnetic control valve. One way to reduce the operating voltage is to use a large solenoid valve, which although possible, also comes with trade-offs of increased weight and reduced responsiveness which must be taken into consideration.

Therefore, in this example embodiment, the ECU 200 executes optimal distribution control of the front and rear braking force based on the state of the power supply. As a result, the target braking force or the required brake performance can be achieved even if the state of the power supply changes. The front-wheel wheel cylinder in this example embodiment may be regarded as a second wheel cylinder of the invention and the rear-wheel wheel cylinder in this example embodiment may be regarded as a first wheel cylinder of the invention.

One reason for performing braking force distribution control according to this example embodiment between the front and rear wheels is because the normally closed pressure reduction valves 42FR and 42FL are connected to the front-wheel wheel cylinders 20FR and 20FL, and the normally open pressure reduction valves 42RR and 42RL are connected to the rear-wheel wheel cylinders 20RR and 20RL. Because the pressure reduction valves 42FR and 42FL on the front wheel side are normally closed, the hydraulic pressure can be maintained in the wheel cylinders without the valves being energized. On the other hand, the pressure reduction valves 42RR and 42RL on the rear wheel side are normally open and thus need to be closed, which requires energizing them, in order to maintain the hydraulic pressure. The maximum pressure that can be maintained in the rear-wheel wheel cylinders 20RR and 20RL is limited by the electromagnetic force able to be generated by the solenoid coils 20RR and 20RL of the pressure reduction valves 42RR and 42RL. This electromagnetic force is determined by the amount of current flowing to the solenoid coil according to the power supply voltage.

Therefore, in this example embodiment, more specifically, the hydraulic pressure upper limit value for the rear wheel side is set based on the power supply voltage. Then during braking, the braking force distribution is controlled so that a portion of the target pressure is generated by controlling the rear wheel hydraulic pressure so that it equal to or less than the upper limit value, and the rest of the target pressure is generated on the front wheel side. In other words, the hydraulic pressure upper limit value for the wheel cylinders to which the normally open control valves are connected is first set, and then during braking the braking force distribution is controlled so that a portion of the target pressure is generated by controlling the hydraulic pressure of those wheel cylinders so that it equal to or less than the upper limit value, and the rest of the target pressure is generated by the wheel cylinders to which the normally closed control valves are connected. This makes it possible to compensate for the effect that the fluctuation in the power supply state, in particular, the drop in the battery voltage, has on the generated braking force.

The optimal distribution control according to this example embodiment can be executed regardless of the type of power supply used to power the brake control system 10. For example, the ECU 200 may execute the optimal distribution control when the brake control system 10 is being powered by either the battery 90 of the vehicle or the power capacitor 92. In this case, the ECU 200 may detect which power supply, from among the plurality of power supplies connected in parallel to the brake control system 10, is being used to power the brake control system 10, and execute optimal distribution control when it is determined that the power supply that is supplying the power to the brake control system 10 is the power supply with which the optimal distribution control is to be executed.

Also, the ECU 200 may execute the optimal distribution control constantly or only when the state of the power supply is a predetermined state. The ECU 200 executes the optimal distribution control when the SOC of the power supply is low, for example. In this case, the ECU 200 detects the SOC of the power supply, determines whether to execute the optimal distribution control based on the detected SOC, and executes the optimal distribution control when necessary. The ECU 200 may also execute the optimal distribution control when the voltage able to be supplied from the power supply to the brake control system 10 is equal to or less than a predetermined threshold value. Alternatively, the ECU 200 may execute the optimal distribution control when the voltage able to be supplied to a particular control valve in the brake control system 10, such as the rear pressure reduction valves 42RR and 42RL, is equal to or less than a predetermined threshold value. The predetermined value in this case may be set appropriately for the type of vehicle or running state based on, for example, the current characteristic of the control valve, the required brake performance, the driving characteristics of the vehicle, and the like. Incidentally, the SOC of the power supply may be detected using a measurement value from a voltage sensor or the like provided in an electrical circuit that includes the brake control system and the power supply.

Also, when the SOC of the power supply is high, i.e., above a predetermined threshold level, the ECU 200 executes braking force distribution control based on a factor other than the state of the power supply, e.g., executes braking force distribution control based on, for example, the running state of the vehicle and the like. When the SOC of the power supply is low, i.e., below the predetermined threshold, the ECU 200 executes the optimal distribution control giving priority to other braking force distribution control.

Figure 3:
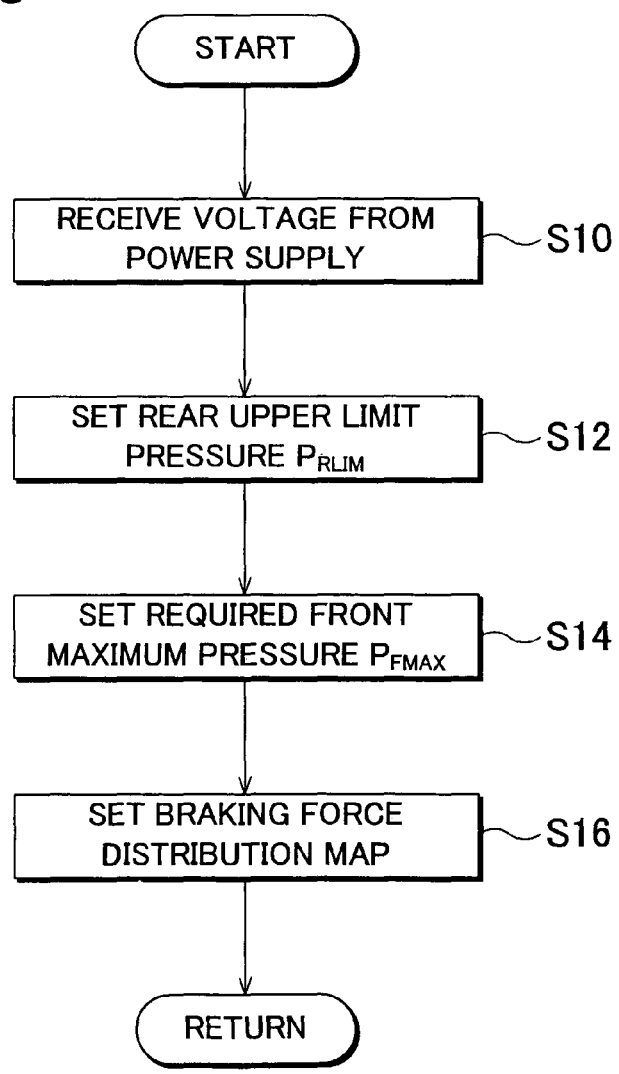
FIG. 3 is a flowchart illustrating a control routine according to the first example embodiment of the invention.

FIG. 3 is a flowchart illustrating a control routine according to the first example embodiment of the invention. The routine shown in FIG. 3 is executed repeatedly in cycles by the ECU 200 when the optimal distribution control is to be executed as described above. The ECU 200 may execute this routine each time before the target pressure is calculated in sync with the target pressure calculation, or less frequently. Also, the ECU 200 may initially execute this routine when the ignition is turned on or when the driver opens a door of the vehicle prior to turning the ignition on.

First, the ECU 200 receives voltage from a power supply such as the battery 90 (step S10). The voltage from the battery 90 is, for example, measured by a voltage sensor provided with the battery 90 and then output to the ECU 200. Next, the ECU 200 sets a rear upper limit pressure $P_{RLIM}$ based on the received power supply voltage (step S12). Further, the ECU 200 obtains a maximum pressure $P_{FMAX}$ to be generated on the front side based on the rear upper limit pressure $P_{RLIM}$ and the statutory brake performance (step S14). The ECU 200 then sets an optimal distribution map of the front and rear braking force for the state of the power supply based on the rear upper limit pressure $P_{RLIM}$ and the required front maximum pressure $P_{FMAX}$ (step S16), after which this cycle of the routine ends.

Each of these steps will now be described in more detail. When setting the rear upper limit pressure (step S12), more specifically, the ECU 200 calculates the current value supplied to the coils of the rear pressure reduction valves 42RR and 42RL from the input value of the power supply voltage, and obtains the maximum pressure that can be maintained in the rear wheel cylinders 20RR and 20RL using the current-pressure characteristic of those control valves, which is stored in advance. The ECU 200 then sets the rear upper limit pressure to a value equal to or less than this maximum pressure.

Figure 4:
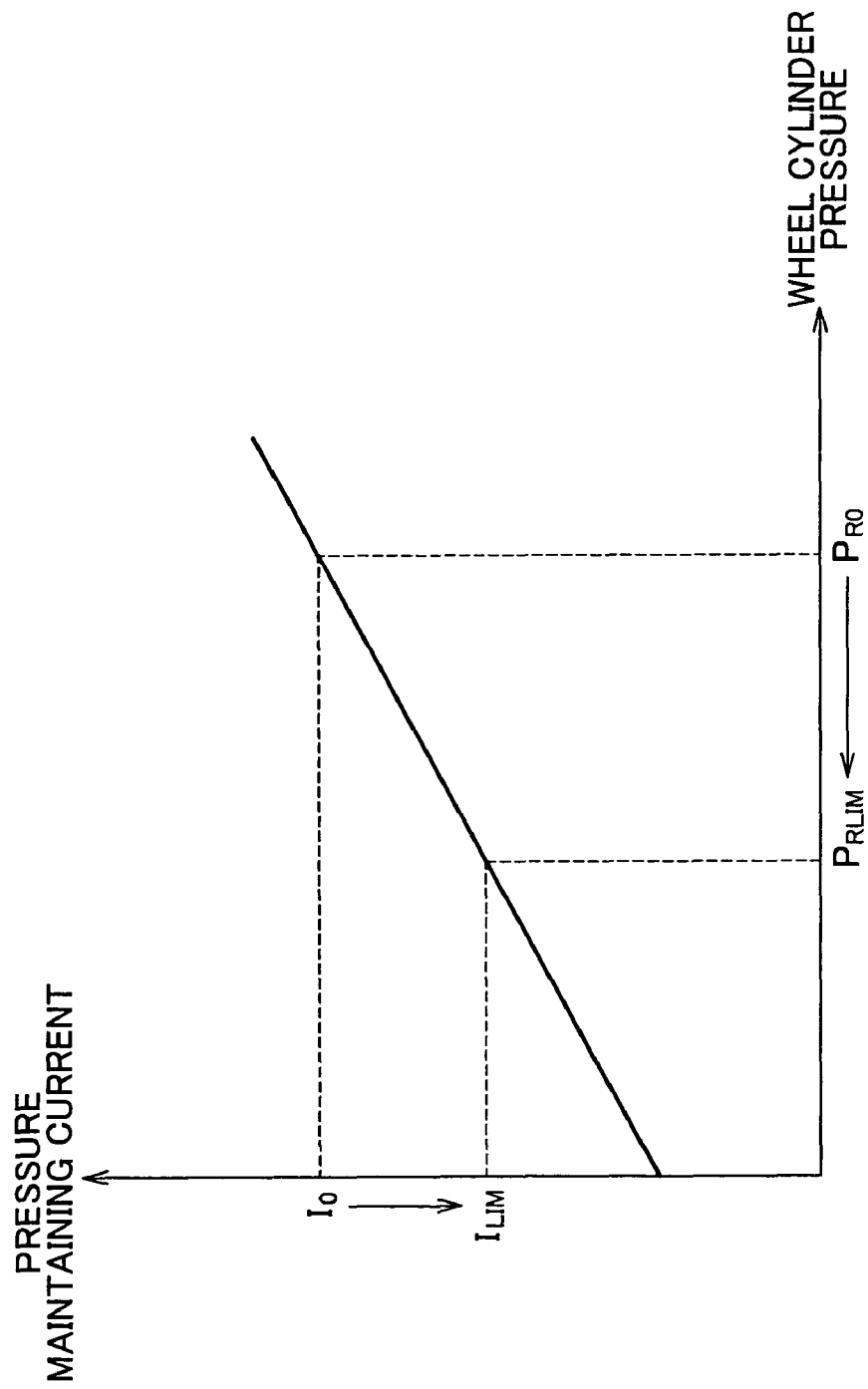
FIG. 4 is a graph showing an example of a current-pressure characteristic of a rear pressure reduction valve.

FIG. 4 is a graph showing an example of a current-pressure characteristic of the rear pressure reduction valves 42RR and 42RL. The horizontal axis of the graph in FIG. 4 represents the differential pressure acting on the pressure reduction valves 42RR and 42RL, i.e., the rear wheel cylinder pressure. The vertical axis of the graph represents the current value required to maintain the wheel cylinder pressure (hereinafter this current value will be referred to as "pressure maintaining current"). As shown in FIG. 4, a larger pressure maintaining current value is necessary the higher the wheel cylinder pressure is. That is, the amount of wheel cylinder pressure able to be maintained is linked to the value of the current supplied to the control valves. Also, the drive circuit is configured such that a current $I_0$ which enables the desired rear maximum pressure $P_{R0}$ to be maintained is supplied to the pressure reduction valves 42RR and 42RL when the voltage supplied by the power supply is sufficient.

In contrast, when the supply voltage is low, the hydraulic pressure that can be maintained in the rear wheel cylinder drops from the rear maximum pressure $P_{R0}$ to rear upper limit pressure $P_{RLIM}$. This is because the current supplied to the coils of the pressure reduction valves 42RR and 42RL drops from a specified value $I_0$ to $I_{LIM}$ due to the drop in voltage. Therefore, the ECU 200 sets the rear upper limit pressure $P_{RLIM}$ to a value equal to the maximum pressure that can be maintained, for example. In this way, the rear upper limit pressure $P_{RLIM}$ is set based on the input power supply voltage.

Incidentally, the rear upper limit pressure may also be set to a value less than the pressure that can be maintained. When the upper limit pressure is set to a value corresponding to the power supply voltage, as described above, the upper limit pressure fluctuates together with the temporal fluctuation in the power supply voltage. In order to avoid this kind of fluctuation in the upper limit pressure, the rear upper limit pressure may be set to the pressure that is able to be maintained which corresponds to a fixed value that is the difference of the actual power supply voltage minus a predetermined margin, for example. Setting the upper limit pressure on the low side in this way is advantageous in that it enables the voltage supplied to the pressure reduction valves 42RR and 42RL to be further reduced. Incidentally, any of the set values described in this specification may be set with a margin that reduces the voltage supplied to the brake actuator 80 or the control valves therein.

Next, when setting the required front maximum pressure $P_{FMAX}$ (step S14), the ECU 200 sets the required front maximum pressure $P_{FMAX}$ so that when the rear upper limit pressure $P_{RLIM}$ is generated, the sum of the rear upper limit pressure $P_{RLIM}$ and the required front maximum pressure $P_{FMAX}$ satisfies the required brake performance. The required brake performance in this case is the maximum braking force to be realized at the desired timing, and includes the statutory brake performance, for example.

Figure 5:
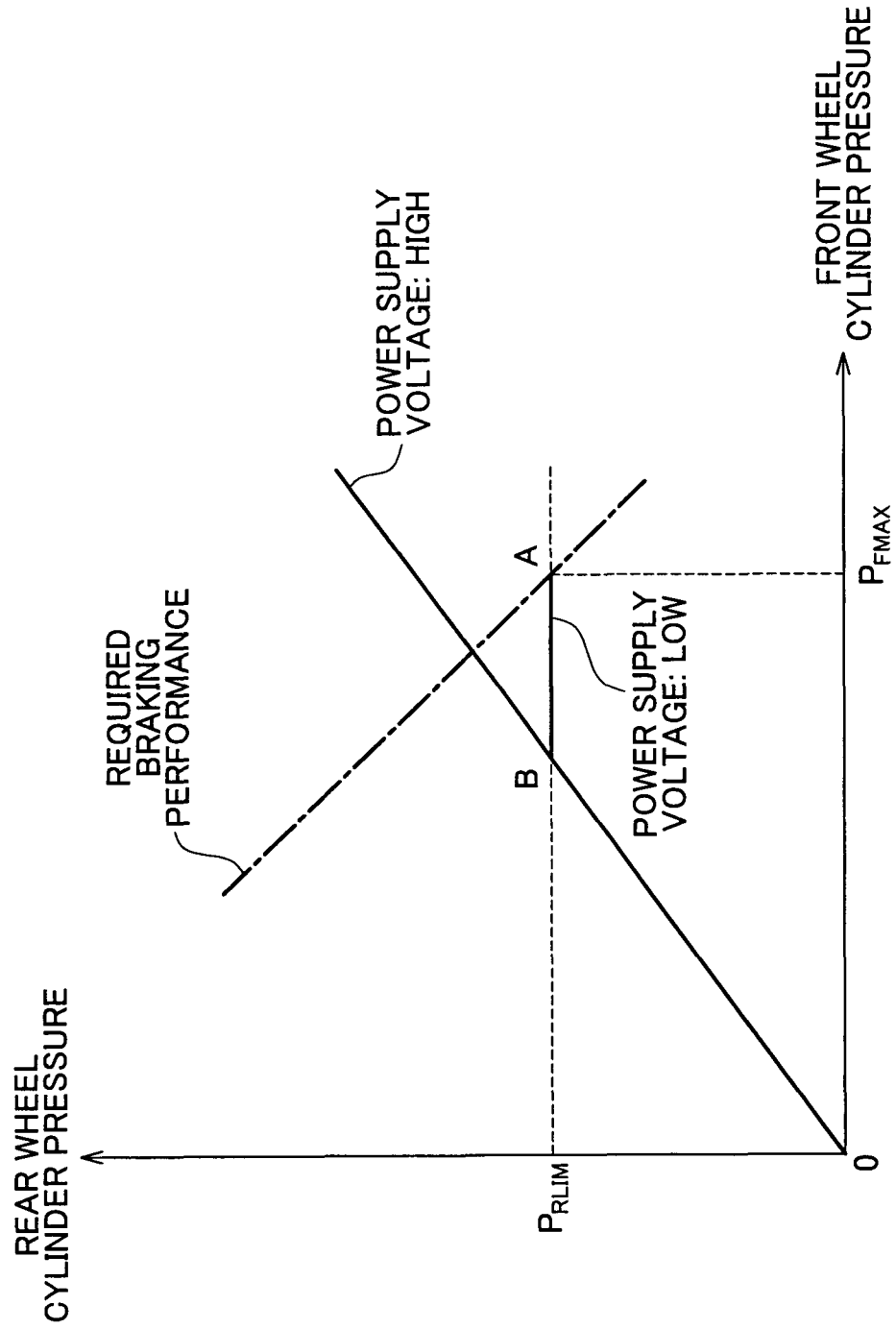
FIG. 5 is a graph showing an example setting of a required front maximum pressure.

FIG. 5 is a graph showing an example setting of a required front maximum pressure $P_{FMAX}$. The horizontal axis in the graph in FIG. 5 represents the front wheel cylinder pressure and the vertical axis represents the rear wheel cylinder pressure. The reference braking force distribution, e.g., the braking force distribution when the SOC of the battery is high, is shown by the solid line in FIG. 5. Also, the braking force distribution that satisfies the required brake performance is shown by the alternate long and short dash line.

As shown in FIG. 5, the ECU 200 sets the front pressure at point A where the line representing the required brake performance intersects the line representing the rear upper limit pressure $P_{RLIM}$ as the required front maximum pressure $P_{FMAX}$. This enables the front side pressure to compensate for the lack of rear wheel cylinder pressure which is limited by the power supply voltage so that the required brake performance can be satisfied.

The ECU 200 then sets a front/rear braking force distribution map from the rear upper limit pressure $P_{RLIM}$ and the required front maximum pressure $P_{FMAX}$ (step S16). The ECU 200 uses a braking force distribution for a high SOC, i.e., for normal operation, until the rear pressure reaches the upper limit value (line segment 0B in FIG. 5), and if further deceleration is required, only the front pressure is increased while the rear pressure is fixed at the upper limit value $P_{RLIM}$ (line segment BA in FIG. 5). Incidentally, a different braking force distribution than that shown in the drawing can also be used as long as the line representing the braking force distribution passes through point A. For example, a line extending from 0 to point A (i.e., line 0A) may be set as the braking force distribution.

In setting the rear upper limit pressure described above, the upper limit pressure is linked to the power supply voltage so the rear upper limit pressure is set higher the higher the power supply voltage is. However, it may result in the rear pressure exceeding the front pressure during braking. Typically, the preferable braking force balance between the front and rear is realized by setting the front pressure higher than the rear pressure. Therefore, in the optimal distribution control according to the example embodiment, it is desirable to set the braking force distribution so that the front wheel cylinder pressure is higher than the rear wheel cylinder pressure. That is, it is desirable to set the braking force distribution map based on a guard condition that the front pressure be equal to or greater than the rear pressure. In FIG. 5, the set braking force line is preferably in the region below the line indicative of equal front and rear pressures. As a result, the rear pressure will not exceed the front pressure when the SOC of the power supply is sufficient, thereby enabling good braking force balance between the front and rear to be realized.

Figure 6:
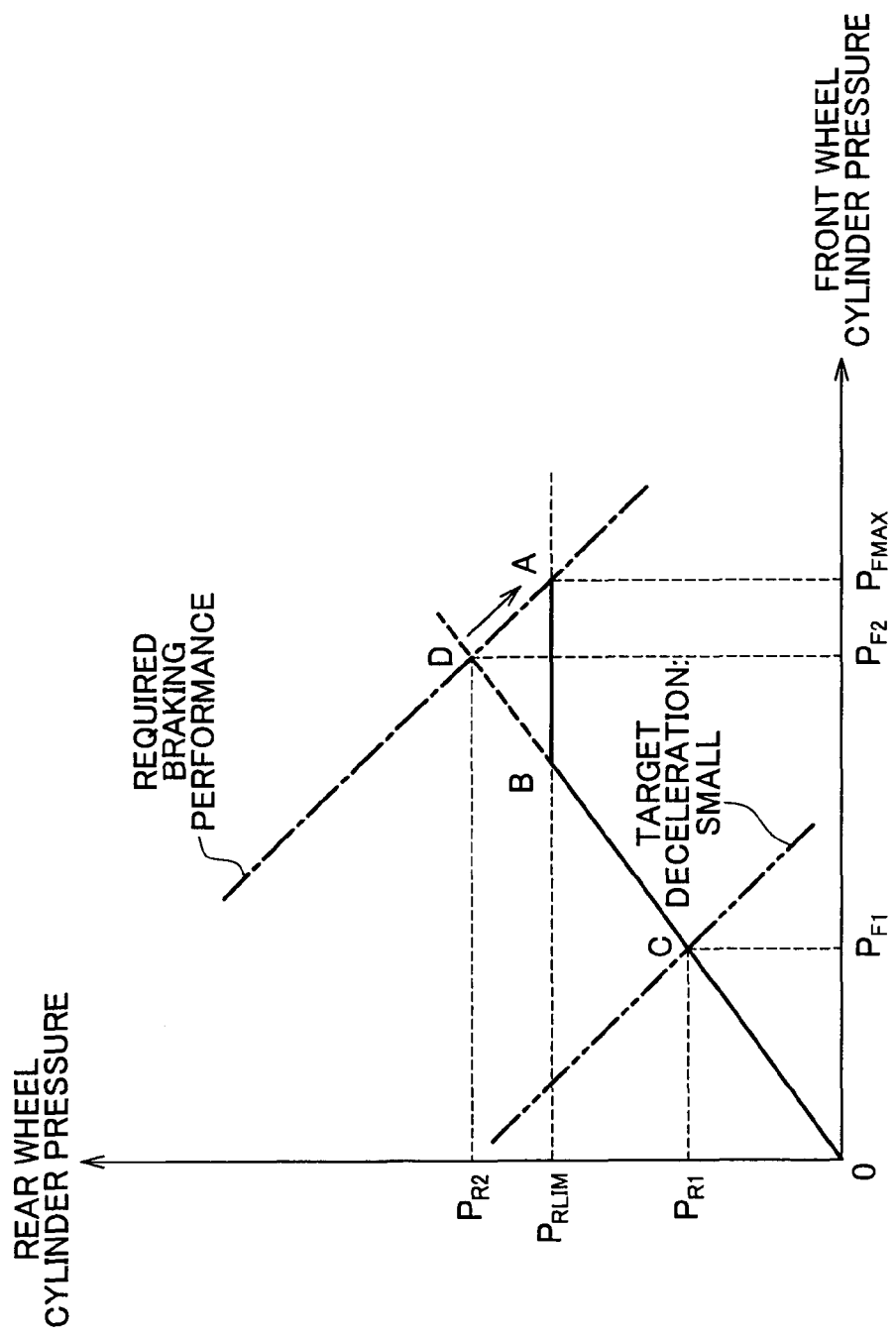
FIG. 6 is a graph showing an example of braking force distribution according to optimal distribution control in the first example embodiment.

FIG. 6 is a graph showing an example of braking force distribution according to the optimal distribution control in the first example embodiment. The horizontal axis in the graph in FIG. 6 represents the front wheel cylinder pressure and the vertical axis represents the rear wheel cylinder pressure. The braking force distribution map described with reference to FIG. 5 is shown by the solid line (i.e., the bent line 0BA). As an example, the graph shows a case in which the target deceleration set according to a brake operation by the driver or the like is relatively small, and a case in which the target deceleration is relatively large (i.e., a case in which the target deceleration equals the required brake performance). The braking force distribution when the target deceleration is relatively small is shown by the alternate long and short two dashes line in FIG. 6.

First, in the case where the target deceleration is relatively small, the front/rear braking force distribution is set so as to correspond to the point (point C in the drawing) where the line representing the target deceleration intersects the braking force distribution line according to this example embodiment. That is, the ECU 200 sets the target pressure of the front wheel cylinders 20FR and 20FL to $P_{F1}$ and sets the target pressure of the rear wheel cylinders 20RR and 20RL to $P_{R1}$. The front target pressure $P_{F1}$ and the rear target pressure $P_{R1}$ are equal to target pressures that are set according to the braking force distribution used when the SOC of the power supply is high. The ECU 200 then controls the pressure increase valves 40FR to 40RL and the pressure reduction valves 42FR to 42RL so that the actual wheel cylinder pressures follow these target pressures.

However, if the normal braking force distribution is presumed when trying to achieve the required brake performance (i.e., when the target deceleration is large), the front/rear braking force distribution will end up being set so as to correspond to the point (point D in the drawing) where the line representing the required brake performance and the line representing the braking force distribution during normal operation intersect. That is, the ECU 200 will end up setting the target pressure of the front wheel cylinders 20FR and 20FL to $P_{F2}$ and setting the target pressure of the rear wheel cylinders 20RR and 20RL to $P_{R2}$. However, the rear wheel cylinder pressure is only actually able to be generated up to the maintainable maximum pressure $P_{RLIM}$ which is not as high as the target pressure $P_{R2}$, due to the SOC of the power supply. As a result, the required brake performance is unable to be achieved.

In contrast, with the optimal distribution control according to this example embodiment, the braking force is generated according to the braking force distribution that corresponds to point A as described above. Compared to the normal braking force distribution, the rear wheel cylinder pressure is limited to the upper limit pressure $P_{RLIM}$ according to the power supply voltage while the front wheel cylinder pressure is complementarily increased up to the required pressure $P_{FMAX}$.

According to the first example embodiment of the invention described above, the hydraulic pressure of the rear wheel cylinders provided with the normally closed pressure reduction valves is controlled to within a feasible control range that is linked to the SOC of the power supply. As a result, the required braking force can be generated with the cooperation of the front side even when the SOC is low.

Next, a second example embodiment of the invention will be described. This second example embodiment differs from the first example embodiment in that a step is added for determining whether the required pressure $P_{FMAX}$ can be generated in the front-wheel wheel cylinders 20FR and 20FL, based on the SOC of the power supply. Also, if it is determined based on the SOC of the power supply that the required pressure $P_{FMAX}$ cannot be generated in the front-wheel wheel cylinders 20FR and 20FL, then a step is also added for increasing the pressure upstream of the pressure increase valves 40FR to 40RL, i.e., the accumulator pressure, so that at least the required pressure $P_{FMAX}$ can be generated. Incidentally, parts in the following description of the second example embodiment that are the same as those in the description of the first example embodiment will accordingly be omitted.

Figure 7:
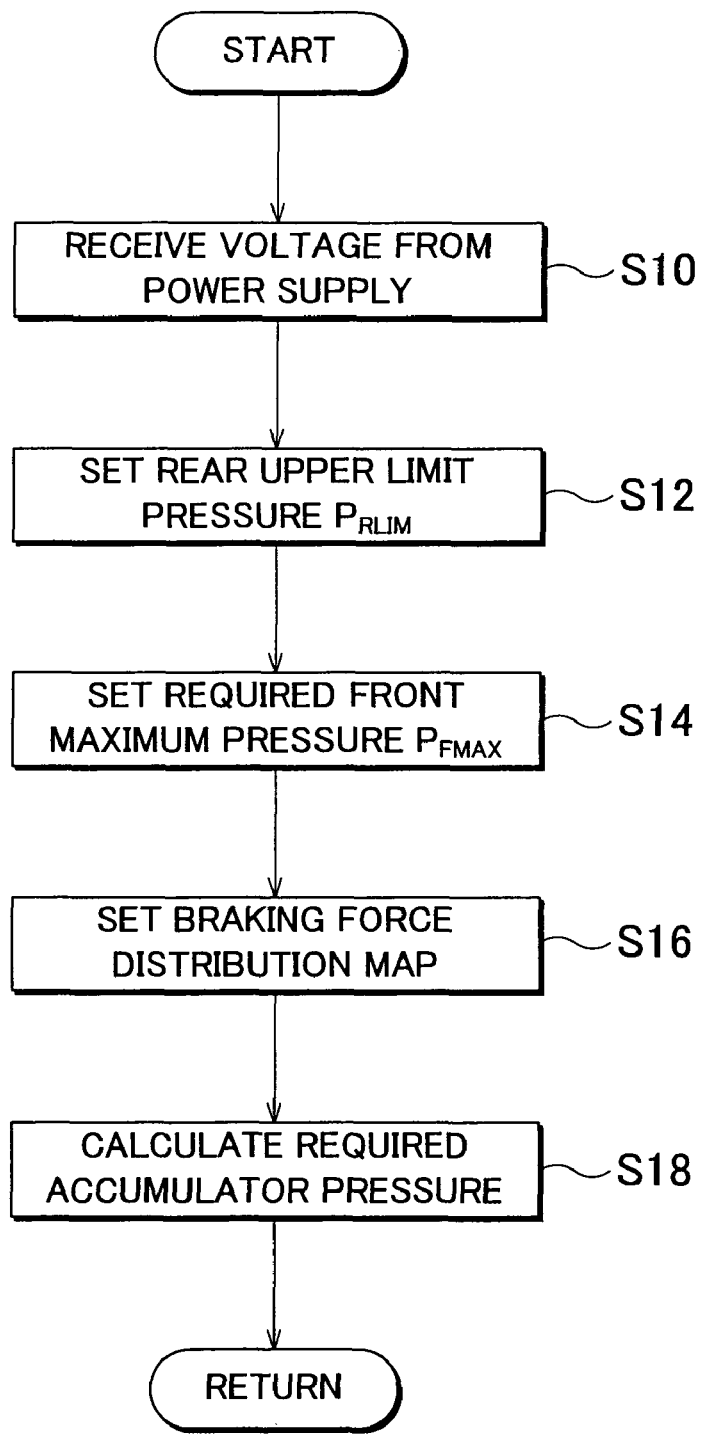
FIG. 7 is a flowchart illustrating a control routine according to a second example embodiment of the invention.

FIG. 7 is a flowchart illustrating a control routine according to the second example embodiment of the invention. As shown in FIG. 7, in the second example embodiment, a step for calculating the required accumulator pressure (step S18) is added after the step for setting the braking force distribution map (step S16). This step for calculating the required accumulator pressure is a step in which it is determined whether the required front pressure $P_{FMAX}$ can be generated, and if it cannot be generated, the accumulator pressure is increased so that the required pressure $P_{FMAX}$ can be generated. Incidentally, the step for calculating the required accumulator pressure may also be added after the step for setting the required front pressure $P_{FMAX}$ (step S14). The other steps (i.e., steps S10 to S16) are the same as in the first example embodiment so descriptions thereof will be omitted.

Figure 8:
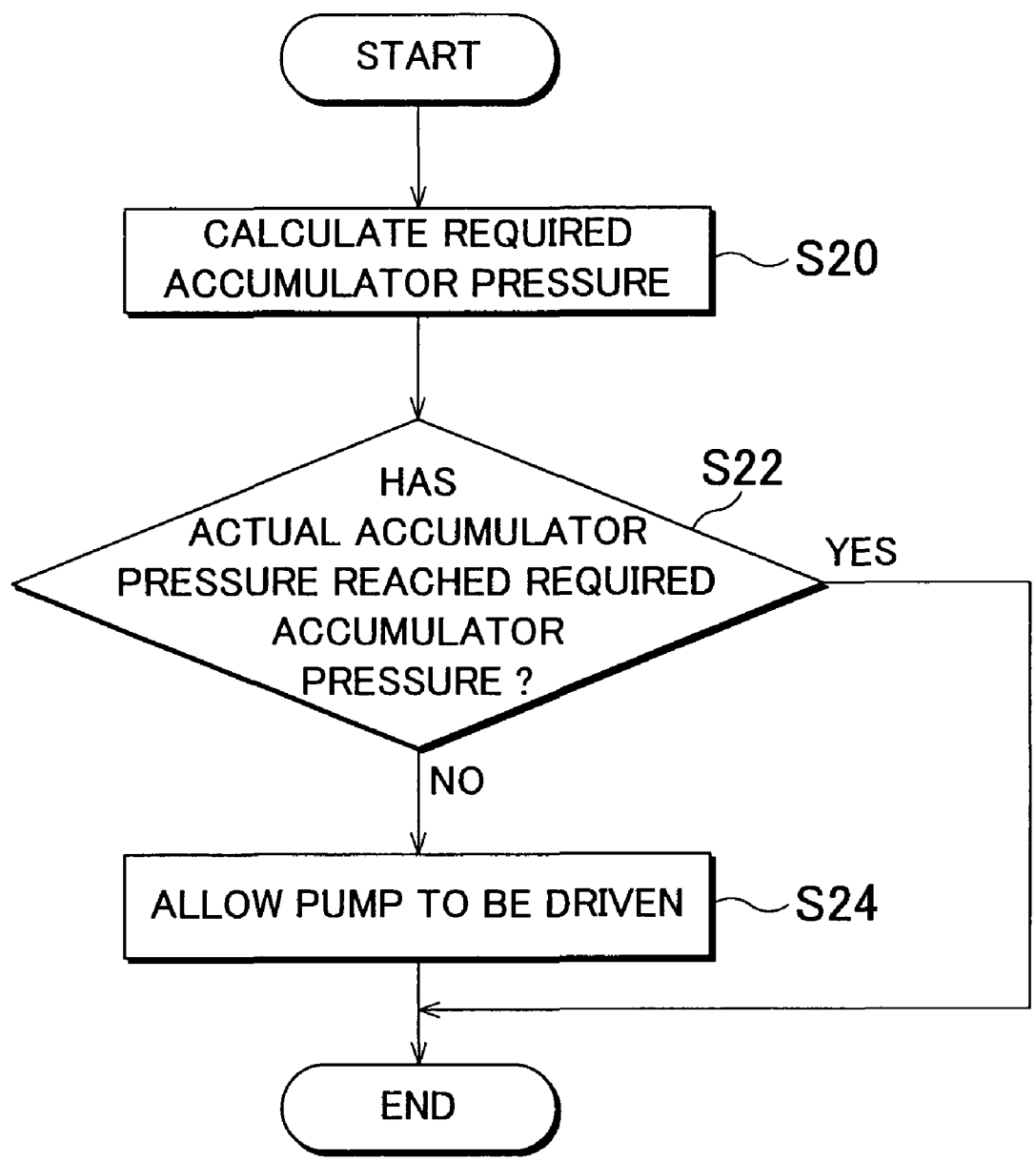
FIG. 8 is a flowchart illustrating a routine for calculating the required accumulator pressure according to the second example embodiment.

FIG. 8 is a flowchart illustrating a routine for calculating the required accumulator pressure according to the second example embodiment. As shown in FIG. 8, the ECU 200 first calculates the required accumulator pressure Pa (step S20). The required accumulator pressure Pa is the accumulator pressure required to increase the pressure in the wheel cylinders 20 to the required pressure $P_{FMAX}$ using the pressure increase valves 40FR to 40RL, and is a value that is determined according to the current supplied to the pressure increase valves 40FR to 40RL.

Figure 9:
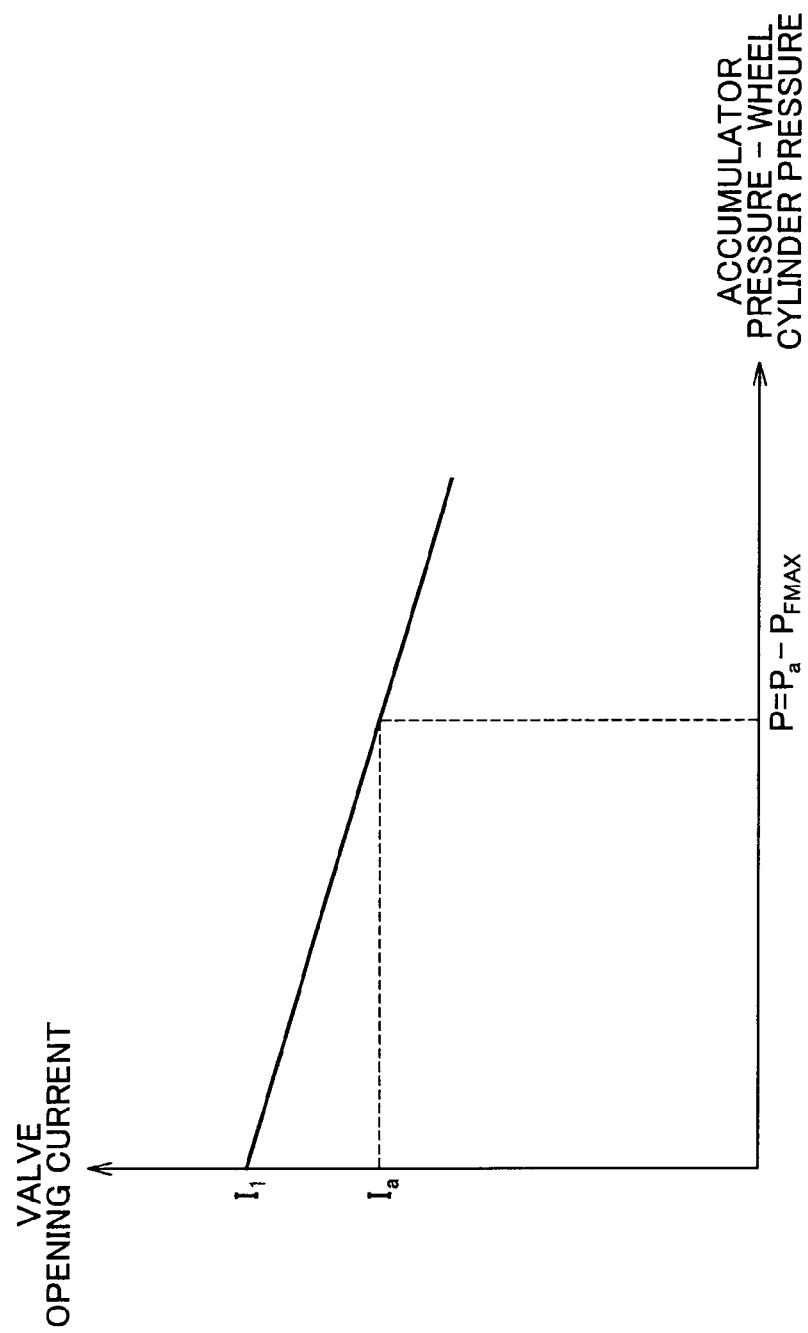
FIG. 9 is a graph showing an example of a current-pressure characteristic of a pressure increase valve.

The calculation of the required accumulator pressure will now be described with reference to FIG. 9, which is a graph showing an example of a current-pressure characteristic of the pressure increase valves 40FR to 40RL. The horizontal axis in the graph in FIG. 9 represents the differential pressure acting on the pressure increase valves 40FR to 40RL, i.e., the differential pressure between the accumulator pressure and the wheel cylinder pressure. The vertical axis in the graph represents the current value required to open the pressure increase valves 40FR to 40RL based on the differential pressure (hereinafter this current value will be referred to as the "valve opening current" when appropriate). When the power supply is sufficiently charged, a drive circuit of the pressure increase valves 40FR to 40RL is formed such that a specified maximum current that is larger than the valve opening current $I_1$ when the differential pressure acting on the pressure increase valves 40FR to 40RL is zero, for example, is able flow. Accordingly, when the SOC is high, the pressure increase valves 40FR to 40RL can be opened to increase the wheel cylinder pressure regardless of the amount of differential pressure acting on the pressure increase valves 40FR to 40RL.

However, when the voltage from the power supply drops, so too does the current to the pressure increase valves 40FR to 40RL. If the supply current drops below the valve opening current $I_1$ when the differential pressure acting on the pressure increase valves 40FR to 40RL is zero, the pressure increase valves 40FR to 40RL may remain closed even if the valves are energized, depending on the amount of differential pressure.

As shown in FIG. 9, the valve opening current must be increased as the differential pressure acting on the pressure increase valves 40FR to 40RL decreases. That is, the accumulator pressure must be increased when the current supplied to the pressure increase valves 40FR to 40RL is small in order to realize the predetermined wheel cylinder pressure with the pressure increase valves 40FR to 40RL. More specifically, as shown in FIG. 9, the differential pressure P between upstream and downstream of the pressure increase valves 40FR to 40RL is determined corresponding to the current Ia supplied to the pressure increase valves 40FR to 40RL according to the SOC of the power supply. In this case, the required accumulator pressure Pa is obtained by assuming that the hydraulic pressure on the downstream side is the required pressure $P_{FMAX}$. That is, the sum of the differential pressure corresponding to the current Ia and the required pressure $P_{FMAX}$ becomes the required accumulator pressure Pa.

Incidentally, the ECU 200 may also calculate the accumulator pressure when turning the pump 34 on or off, as well as calculate the required accumulator pressure Pa. By setting the accumulator pressure that turns the pump on or off so that it is related to the required accumulator pressure Pa, the accumulator pressure can be appropriately maintained near the required accumulator pressure Pa. The accumulator pressure that turns the pump 34 on may be set to a value that is equal to or slightly larger than the required accumulator pressure Pa, for example. Accordingly, the accumulator pressure can be restored to equal to or greater than the required accumulator pressure Pa by starting the pump 34 when the accumulator pressure drops to the required accumulator pressure Pa. Also, the accumulator pressure that turns the pump 34 off can be appropriately set to a value that is a predetermined amount larger than the accumulator pressure that turns the pump 34 on.

Referring back to FIG. 8 again, after the required accumulator pressure Pa is obtained, the ECU 200 determines whether the actual accumulator pressure has reached the required accumulator pressure Pa (step S22). The actual accumulator pressure is obtained according to the measurement value from the accumulator pressure sensor 51. If it is determined that the accumulator pressure has reached the required accumulator pressure Pa (i.e., Yes in step S22), it means that the required pressure $P_{FMAX}$ can be generated in the wheel cylinders so this cycle of the routine ends. Incidentally, at this time the ECU 200 may cancel a flag allowing the pump 34 to be driven, which will be described next.

If, on the other hand, the accumulator pressure has not reached the required accumulator pressure Pa (i.e., No in step S22), the ECU 200 allows the pump 34 to be driven and then this cycle of the routine ends. More specifically, the ECU 200 sets a flag allowing the pump 34 to be driven, for example.

In this case, the ECU 200 controls the pump 34 and the motor 32 separately based on the measured accumulator pressure. The ECU 200 increases the accumulator pressure by driving the pump 34 when it is detected that the actual accumulator pressure is lower than the accumulator pressure at which the pump 34 should be turned on. The ECU 200 then stops increasing the accumulator pressure by stopping the pump 34 when the accumulator pressure reaches the accumulator pressure at which the pump 34 should be turned off.

Here, the ECU 200 may also supply current to the pump 34 only when current is not being supplied to the pressure increase valves 40FR to 40RL and the pressure reduction valves 42FR to 42RL. The ECU 200 may also supply current to the pump 34 and increase the accumulator pressure while the driver is not operating the brake pedal, for example. Alternatively, the ECU 200 may calculate the required accumulator pressure Pa and increase the accumulator pressure as necessary when the ignition is turned on or the driver opens a door of the vehicle before the ignition is turned on. In this way, the operating voltage of the brake actuator 80 can be relatively reduced by not driving the pump 34 at the same time that current is supplied to the control valves.

Incidentally, the ECU 200 may also determine whether the actual accumulator pressure has reached a value that is a predetermined amount larger than the required accumulator pressure Pa. Then the ECU 200 may control the pump 34 to increase the accumulator pressure to a value that is a predetermined amount larger than the required accumulator pressure Pa. Setting the accumulator pressure higher than the required accumulator pressure Pa in this way is advantageous in that it enables the amount of current required to operate the pressure increase valves 40FR to 40RL to be reduced.

Also, when it is determined that the accumulator pressure has not reached the required accumulator pressure Pa, the ECU 200 may issue a warning that the required brake performance is unable to be achieved because the accumulator pressure is not at the required accumulator pressure Pa. The warning issued by the ECU 200 may be a visual warning which is issued by lighting up a warning lamp, for example, or an audible warning which is issued using a buzzer or the like.

As described above, with this second example embodiment, the pressure upstream of the pressure increase valves 40FR to 40RL is increased to enable the required pressure $P_{FMAX}$, which is to be generated in the front-wheel wheel cylinders 20FR and 20FL, to be generated in order to achieve the required brake performance. As a result, it is possible to ensure that the required pressure $P_{FMAX}$ is generated, in turn making it possible to ensure that the required brake performance can be realized.

Next, a third example embodiment of the invention will be described. In this third example embodiment, normally open control valves are used in addition to the front wheel pressure reduction valves 42FR and 42FL, which are normally closed, to decrease the front-wheel wheel cylinder pressure. Hereinafter, a specific example will be described in which the front-wheel wheel cylinder pressure is decreased using the master cutoff valves 27FR and 27FL which are normally open control valves.

This third example embodiment can be carried out in combination with, or independent from, the first or second example embodiments described above. Incidentally, parts in the following description of the third example embodiment that are the same as those in the description of the first example embodiment will accordingly be omitted.

Figure 10:
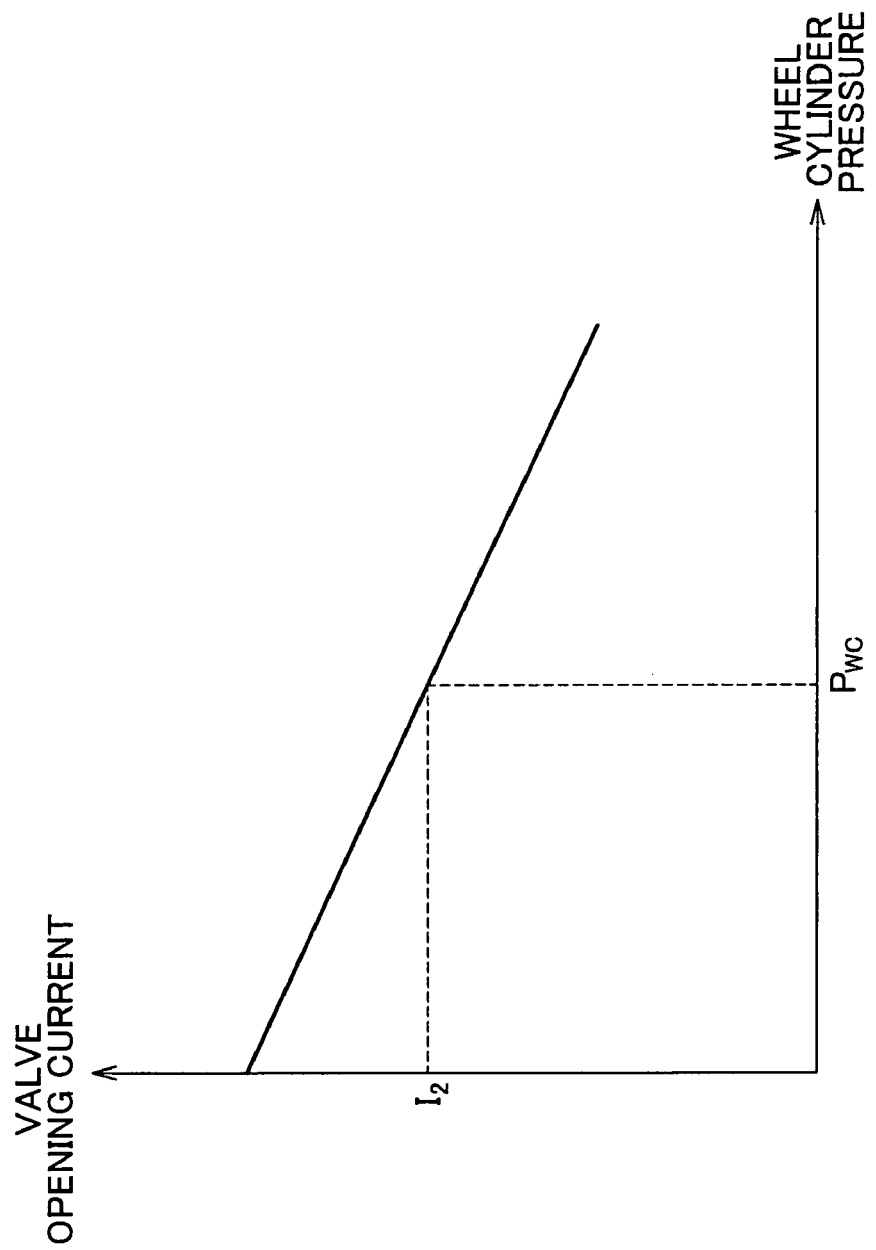
FIG. 10 is a graph showing an example of a current-pressure characteristic of a front pressure reduction valve.

FIG. 10 is a graph showing an example of a current-pressure characteristic of the front wheel pressure reduction valves 42FR and 42FL. The horizontal axis of the graph in FIG. 10 represents the differential pressure acting on the front wheel pressure reduction valves 42FR and 42FL, i.e., the front-wheel wheel cylinder pressure. The vertical axis of the graph represents the current value required to open the front wheel pressure reduction valves 42FR and 42FL based on the wheel cylinder pressure (hereinafter this current value will be referred to as the "valve opening current" when appropriate). As shown in FIG. 10, the valve opening current needs to be increased as the wheel cylinder pressure drops. Therefore, when the supply current is low, the front wheel pressure reduction valves 42FR and 42FL may no longer be able to be kept open so the wheel cylinder may no longer be able to be decreased using the front wheel pressure reduction valves 42FR and 42FL. For example, as shown in FIG. 10, when the current supplied to the front wheel pressure reduction valves 42FR and 42FL decreases to $I_2$, the front-wheel wheel cylinder pressure is only able to be reduced to the corresponding wheel cylinder pressure Pwc.

In this case, the ECU 200 reduces the front-wheel wheel cylinder pressure using the master cutoff valves 27FR and 27FL. Therefore, the ECU 200 determines whether to allow the master cutoff valves 27FR and 27FL to open during a brake operation, according to the state of the power supply. If the master cutoff valves 27FR and 27FL are allowed to open during a brake operation, the ECU 200 then opens the master cutoff valves 27FR and 27FL when the difference between the target pressure and the actual pressure exceeds a predetermined range while the front-wheel wheel cylinder pressure is decreasing.

Figure 11:
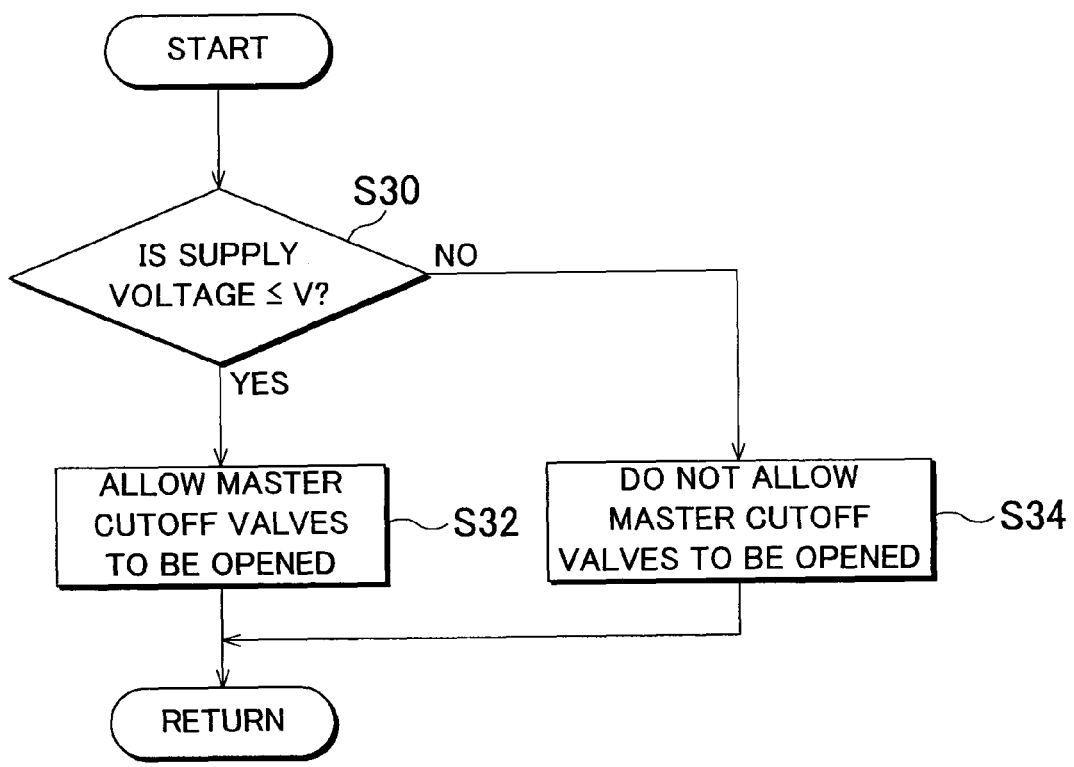
FIG. 11 is a flowchart illustrating a routine for allowing master cutoff valves to open according to a third example embodiment of the invention.

FIG. 11 is a flowchart illustrating a routine for allowing the master cutoff valves to open according to the third example embodiment. The ECU 200 performs this routine for allowing the master cutoff valves to open by allowing the master cutoff valves 27FR and 27FL to open during a brake operation when the voltage supplied from the power supply is equal to or less than a predetermined threshold value, and not allowing the master cutoff valves 27FR and 27FL to open during a brake operation when the voltage supplied from the power supply is greater than the predetermined threshold value. This routine is executed repeatedly at predetermined cycles, for example, in the ECU 200.

As shown in FIG. 11, the ECU 200 first determines whether the voltage able to be supplied from the power supply to the front wheel pressure reduction valves 42FR and 42FL is equal to or less than a predetermined threshold value V (step S30). The predetermined threshold value V in this case may be set appropriately taking into account the current-pressure characteristic of the front pressure reduction valves 42FR and 42FL and the decrease characteristic of the wheel cylinder pressure to be achieved, and the like.

If it is determined that the voltage able to be supplied is equal to or less than the predetermined threshold value V (i.e., Yes in step S30), the ECU 200 allows the master cutoff valves 27FR and 27FL to open (step S32). In this case for example, the ECU 200 sets a flag allowing the master cutoff valves 27FR and 27FL to be opened. Conversely, if it is determined that the voltage able to be supplied is greater than the predetermined threshold value V (i.e., No in step S30), then the ECU 200 does not allow the master cutoff valves 27FR and 27FL to be opened (step S34). In this case for example, the ECU 200 sets a flag preventing the master cutoff valves 27FR and 27FL from opening.

Allowing the master cutoff valves 27FR and 27FL to open according to the state of the power supply in this way makes it possible to open the master cutoff valves 27FR and 27FL only when truly necessary. That is, the master cutoff valves 27FR and 27FL which should normally be closed can be opened only when the SOC of the power supply is insufficient during a brake operation.

Figure 12:
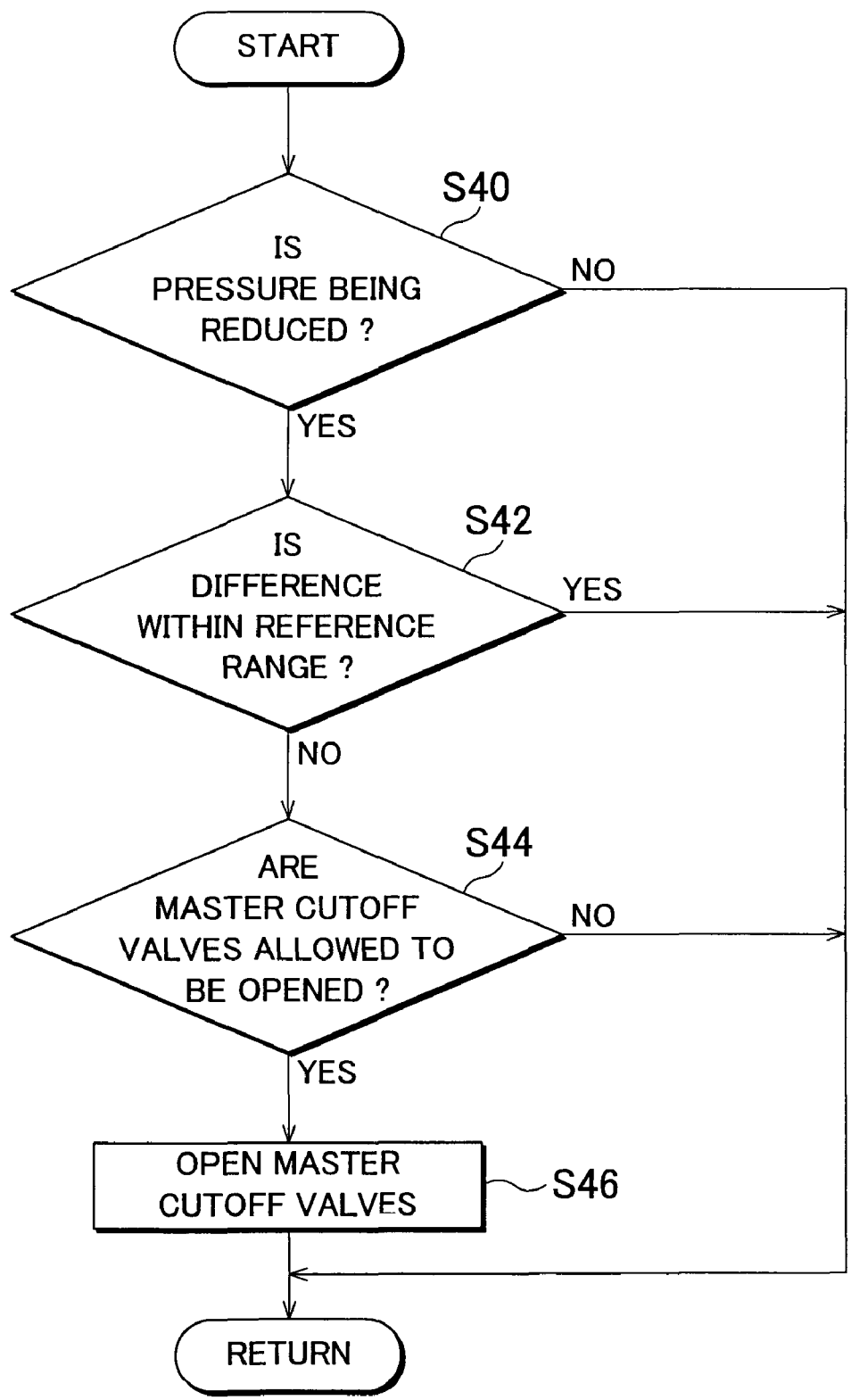
FIG. 12 is a flowchart illustrating a routine for reducing front-wheel wheel cylinder pressure according to the third example embodiment.

FIG. 12 is a flowchart illustrating a routine for reducing the front-wheel wheel cylinder pressure according to the third example embodiment. This routine is executed repeatedly at predetermined cycles, for example, by the ECU 200 during braking.

First the ECU 200 determines whether the routine for reducing the front-wheel wheel cylinder pressure is currently being executed (step S40). That is, the ECU 200 determines whether the front wheel pressure reduction valves 42FR and 42FL should be open. If the front-wheel wheel cylinder pressure is equal to or greater than a predetermined value above the target pressure, the ECU 200 energizes the front wheel pressure reduction valves 42FR and 42FL to reduce the front-wheel wheel cylinder pressure to the target pressure.

If it is determined that the pressure is currently being decreased (i.e., Yes in step S40), then the ECU 200 determines whether the difference between the target pressure and the front-wheel wheel cylinder pressure is within a predetermined reference range (step S42). For example, the ECU 200 determines that the difference is exceeding the reference range when the difference remains above a predetermined value for a predetermined period of time or longer. If the difference is within the reference range, the pressure reduction by the front wheel pressure reduction valves 42FR and 42FL is considered to be effective. However, if the difference is exceeding the reference range, the pressure reduction by the front wheel pressure reduction valves 42FR and 42FL is considered to be ineffective. The reference range in this case may be set appropriately based on, for example, the pressure reduction characteristic to be realized or the like.

If it is determined that the difference is exceeding the reference range (i.e., No in step S42), then the ECU 200 determines whether the master cutoff valves 27FR and 27FL are allowed to open (step S44). If it is determined that the voltage able to be supplied is equal to or less than the predetermined threshold value V in the routine for allowing the master cutoff valves to open (FIG. 11), described above, the master cutoff valves 27FR and 27FL are allowed to open.

If it is determined that the master cutoff valves 27FR and 27FL are allowed to open (i.e., Yes in step S44), the ECU 200 opens the master cutoff valves 27FR and 27FL (step S46). That is, the ECU 200 stops supplying current to the master cutoff valves 27FR and 27FL, which are normally open electromagnetic switching valves, so that the master cutoff valves 27FR and 27FL open. As a result, the front-wheel wheel cylinder pressure drains to the master cylinder 14 using the master cutoff valves 27FR and 27FL so the front-wheel wheel cylinder pressure reductions. The pressure reduction path can be ensured simply by stopping the supply of current so the pressure can be reliably decreased even if the power supply voltage is low.

If, on the other hand, it is determined that the pressure is not currently being decreased (i.e., No in step S40), the difference is within the reference range (i.e., Yes in step S42), and the master cutoff valves are not allowed to be opened (i.e., No in step S44), then this cycle of the routine ends without the ECU 200 opening the master cutoff valves.

According to this example embodiment, the front-wheel wheel cylinder pressure can be more reliably decreased by using the master cutoff valves 27FR and 27FL which are normally open control valves. Also, using the master cutoff valves 27FR and 27FL obviates the need to provide new normally open control valves, which is advantageous in that it does not lead to an unnecessary cost increase.

Also, when a brake operation is not being performed, the master cylinder pressure is the same as atmospheric pressure, which is advantageous in that the front-wheel wheel cylinder pressure can be reliably reduced to atmospheric pressure. Therefore, instead of determining whether the difference is within the reference range, the ECU 200 may determine whether a brake operation is not being performed or whether the front-wheel wheel cylinder pressure should be reduced to atmospheric pressure.

In this example embodiment, the ECU 200 preferably opens and closes the master cutoff valves 27FR and 27FL through duty control. When duty control is performed on the master cutoff valves 27FR and 27FL, the master cutoff valves 27FR and 27FL are repeatedly opened and closed in cycles.

Accordingly, the outflow of hydraulic fluid to the master cylinder 14 through the master cutoff valves 27FR and 27FL can be made gradual compared with when the master cutoff valves 27FR and 27FL are opened all at once. This is advantageous in that it makes it possible to avoid a sudden increase in master cylinder pressure, and thus a sudden change in the brake pedal reaction force on the driver. Also, the normal master cylinder pressure is used to calculate the target deceleration which is advantageous in that the mitigation of master cylinder pressure fluctuation contributes to a more stable brake feeling for the driver.

Incidentally, in this example embodiment, it is not absolutely necessary to use duty control. For example, the ECU 200 may also set the duration for which the master cutoff valves 27FR and 27FL are open to try to keep the master cylinder pressure fluctuation within a predetermined range. The predetermined range in this case may be set appropriately so as to achieve a more stable brake feeling, for example.

Also, the ECU 200 may correct the measurement value of the master cylinder pressure in such a way as to mitigate the fluctuation caused by the duty control described above. For example, the ECU 200 may apply a low-pass filter to the master cylinder pressure measured during duty control. Alternatively, for example, the frequency of a low-pass filter originally set to reduce noise may be reduced. The ECU 200 may also correct the target deceleration, which has been calculated based on the measurement value of the master cylinder pressure, in such a way as to mitigate the fluctuation caused by the duty control. Alternatively, the ECU 200 may perform a step for slowing down the rate of change in the master cylinder pressure, such as set a limit for the rate of change in the master cylinder pressure.

Accordingly, the effect from the fluctuation caused by the duty opening/closing control of the master cutoff valves 27FR and 27FL on the master cylinder pressure measurement value can be reduced, or the effect of the duty control on the target deceleration that is ultimately obtained can be reduced. As a result, a more stable brake feeling can be achieved.

Also, the ECU 200 may control the front-wheel wheel cylinder pressure during braking so that it is equal to or greater than the master cylinder pressure when the SOC of the power supply is such that the front-wheel wheel cylinder pressure is unable to be reduced sufficiently, e.g., to atmospheric pressure, with only the front wheel pressure reduction valves 42FR and 42FL. That is, the ECU 200 controls the downstream hydraulic pressure so that downstream of the master cutoff valves 27FR and 27FL is a higher pressure than upstream of the master cutoff valves 27FR and 27FL. Accordingly, the front-wheel wheel cylinder pressure can be reliably reduced using the master cutoff valves 27FR and 27FL when the master cutoff valves 27FR and 27FL are open.

In this case, for example, the ECU 200 may prohibit regenerative cooperative control when the master cutoff valves are allowed to be open. This is because the normal master cylinder pressure is higher than the front-wheel wheel cylinder pressure during regenerative cooperative control. Alternatively, even if regenerative cooperative control is continued, the ECU 200 may control the front-wheel wheel cylinder pressure so that it is equal to or greater than the master cylinder pressure. In order to do this, the ECU 200 may, for example, generate the required braking force by relatively raising the front-wheel wheel cylinder pressure and relatively lowering the rear-wheel wheel cylinder pressure.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

The invention claimed is:

1. A brake control system comprising:
a first wheel cylinder that applies braking force to a first wheel according to hydraulic pressure;
a second wheel cylinder that applies braking force to a second wheel according to hydraulic pressure;
a brake actuator that receives current and individually controls the hydraulic pressure of the first wheel cylinder and the hydraulic pressure of the second wheel cylinder, the brake actuator being connected to a power supply that supplies the current to the brake actuator; and
a control portion that increases a braking force applied to the first wheel cylinder when a voltage able to be supplied from the power supply is equal to or less than a predetermined threshold value.

2. The brake control system according to claim 1, wherein:
the brake actuator includes a normally open control valve that is connected to the first wheel cylinder, which is closed when current to maintain the hydraulic pressure in the first wheel cylinder is supplied to the normally open control valve, and
the control portion sets an upper limit value of the hydraulic pressure of the first wheel cylinder, according to the voltage able to be supplied from the power supply, to equal to or less than a maximum pressure that is capable of being maintained in the first wheel cylinder by the normally open control valve.

3. The brake control system according to claim 2, wherein:
the brake actuator further includes a normally closed pressure reduction valve that is connected to the second wheel cylinder, and
the control portion controls the brake actuator such that a portion of a target hydraulic pressure set according to at least one of a brake operation by a driver and a vehicle state is generated by controlling the hydraulic pressure of the first wheel cylinder to be equal to or less than the upper limit value, and a remaining portion of the target hydraulic pressure is complementarily generated by controlling the hydraulic pressure of the second wheel cylinder.

4. The brake control system according to claim 1, wherein:
the first wheel is a rear wheel,
the second wheel is a front wheel, and
the control portion controls the hydraulic pressure of the second wheel cylinder to be equal to or greater than the hydraulic pressure of the first wheel cylinder.

5. The brake control system according to claim 2, wherein:
the brake actuator further includes a normally closed pressure increase valve that is connected to the second wheel cylinder; and
the control portion i) sets a required hydraulic pressure to be generated in the second wheel cylinder in order to achieve a required brake performance, based on the required brake performance and the upper limit value, ii) determines whether the required hydraulic pressure can be generated in the second wheel cylinder through the pressure increase valve, based on the voltage able to be supplied from the power supply, and iii) increases the pressure upstream of the pressure increase valve so that at least the required hydraulic pressure can be generated when it is determined based on the voltage able to be supplied from the power supply that the required hydraulic pressure cannot be generated in the second wheel cylinder through the pressure increase valve.

6. The brake control system according to claim 5, wherein:
the brake actuator further includes i) a hydraulic pressure source which is provided upstream of the pressure increase valve and accumulates hydraulic fluid in order to increase the pressure upstream of the pressure increase valve, and ii) a pump which is driven by current supplied from the power supply in order to accumulate hydraulic fluid in the hydraulic pressure source, and
the control portion controls the supply of current to the pump so as to accumulate hydraulic fluid in the hydraulic pressure source when current is not being supplied to the normally open control valve and the pressure increase valve.

7. The brake control system according to claim 1, wherein:
the brake actuator includes
a normally closed pressure reduction valve which is connected to the second wheel cylinder and opens when a valve opening current determined according to a differential pressure between a wheel cylinder pressure and atmospheric pressure is supplied, and
a normally open control valve that is connected in parallel with the pressure reduction valve with respect to the second wheel cylinder, and
the control portion reduces the hydraulic pressure of the second wheel cylinder using the pressure reduction valve and the normally open control valve together.

8. The brake control system according to claim 7, wherein the normally open control valve is a master cutoff valve provided between the second wheel cylinder and a manual hydraulic pressure source that pressurizes hydraulic fluid according to a brake operation by a driver.

9. The brake control system according to claim 8, wherein the master cutoff valve is an electromagnetic valve which is opened when a solenoid is de-energized while being closed by electromagnetic force which is generated when a specified control current is supplied to the solenoid.

10. The brake control system according to claim 8, wherein the control portion selectively opens and closes the master cutoff valve by duty control when using the master cutoff valve to reduce the hydraulic pressure of the second wheel cylinder.

11. The brake control system according to claim 10, wherein the control portion corrects one of a measurement value of the hydraulic pressure of the manual hydraulic pressure source and a target deceleration calculated based on the measurement value of the hydraulic pressure, in such a way as to mitigate fluctuation of the hydraulic pressure caused by the duty control.

12. The brake control system according to claim 8, wherein the control portion controls the hydraulic pressure of the second wheel cylinder during braking to be equal to or greater than the hydraulic pressure of the manual hydraulic pressure source when the hydraulic pressure of the second wheel cylinder is unable to be reduced using only the pressure reduction valve under the voltage supplied from the power supply.

13. The brake control system according to claim 1, wherein:
the power supply that supplies current to the brake actuator is provided in plurality, and
the control portion detects a power supply from among the plurality of power supplies which supplies the current, and sets the braking force distribution between the first wheel and the second wheel based on the voltage able to be supplied from that power supply.

14. A brake control method for controlling a braking force distribution between wheels by individually controlling hydraulic pressure supplied to a plurality of wheel cylinders, comprising:
setting, according to a voltage able to be supplied by a power supply, a hydraulic pressure upper limit value for a wheel cylinder in which hydraulic pressure is maintained by supplying current to an accompanying control valve when determining the braking force distribution; and
increasing a braking force applied to a first wheel cylinder when the voltage able to be supplied from the power supply is equal to or less than a predetermined threshold value.

15. The brake control method according to claim 14, further comprising:
generating a portion of a target hydraulic pressure by controlling the hydraulic pressure of the wheel cylinder in which the hydraulic pressure is maintained by supplying current to the accompanying control valve, to the hydraulic pressure upper limit value, while generating a remaining portion of the target hydraulic pressure by controlling the hydraulic pressure of another wheel cylinder.

16. The brake control method according to claim 15, further comprising:
setting a required hydraulic pressure to be generated in the other wheel cylinder in order to achieve a required brake performance, based on the required brake performance and the hydraulic pressure upper limit value, and
increasing the hydraulic pressure of the hydraulic pressure source to generate the required hydraulic pressure in the other wheel cylinder regardless of the voltage able to be supplied by the power supply.

17. The brake control system according to claim 9, wherein the control portion controls the hydraulic pressure of the second wheel cylinder during braking to be equal to or greater than the hydraulic pressure of the manual hydraulic pressure source when the hydraulic pressure of the second wheel cylinder is unable to be reduced using only the pressure reduction valve under the voltage supplied from the power supply.

* * * * *